US011260802B2

(12) United States Patent
Carswell et al.

(10) Patent No.: US 11,260,802 B2
(45) Date of Patent: Mar. 1, 2022

(54) DISPLAY UNIT FOR A VEHICLE

(71) Applicant: Systems and Software Enterprises, LLC, Brea, CA (US)

(72) Inventors: Samuel A. Carswell, Yorba Linda, CA (US); Austin Cotler, Westminster, CA (US); John Park, Anaheim, CA (US); Ernesto Ramirez, Downey, CA (US); Steve Sargeant, Placentia, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 16/241,666

(22) Filed: Jan. 7, 2019

(65) Prior Publication Data

US 2019/0152408 A1 May 23, 2019

Related U.S. Application Data

(62) Division of application No. 15/272,108, filed on Sep. 21, 2016, now Pat. No. 10,173,605.

(51) Int. Cl.
*G06F 1/16* (2006.01)
*B60R 11/02* (2006.01)
(Continued)

(52) U.S. Cl.
CPC .......... *B60R 11/02* (2013.01); *B64D 11/0015* (2013.01); *B64D 11/00152* (2014.12);
(Continued)

(58) Field of Classification Search
CPC .......... B64D 11/0015; B64D 11/00152; B60R 2011/0015; B60R 2011/0075; B60R 11/02; B60R 11/0015
See application file for complete search history.

(56) References Cited

U.S. PATENT DOCUMENTS 5,794,164 A   8/1998  Beckert et al.
5,808,373 A   9/1998  Hamanishi et al.
(Continued)

FOREIGN PATENT DOCUMENTS

EP    0613596 B1   12/1996
EP    1322001 B1    3/2005
(Continued)

OTHER PUBLICATIONS

Korean Intellectual Property Office, International Preliminary Report on Patentability, dated Mar. 26, 2019.
(Continued)

*Primary Examiner* — James Wu
*Assistant Examiner* — Hung Q Dang
(74) *Attorney, Agent, or Firm* — Umberg Zipser LLP; Ryan Dean

(57) ABSTRACT

An entertainment system including a removable seat-back display unit and a docking station. The seat-back display unit can include a rotating latch butterfly release mechanism that prevents unauthorized release of the display unit from the docking station. The system can include a three-point attachment system that provides additional protection against accidental detachment of the display unit, and provide safety in the event of partial dislodging. The system can include a current control pin system that ensures that current is not provided from the docking station to the display unit until the respective connectors have been properly engaged. The system can further include a floating pin connector dock that can allow for installation of the display unit even when the connectors of the display unit and docking station become misaligned. The system can also include a heat dissipation system that employs the docking station to share the heat dissipation load with the display unit.

9 Claims, 23 Drawing Sheets

(51) Int. Cl.
    *B64D 11/00*        (2006.01)
    *B60R 11/00*        (2006.01)
(52) U.S. Cl.
    CPC ............. *B60R 2011/0015* (2013.01); *B60R 2011/0075* (2013.01)

(56) References Cited

U.S. PATENT DOCUMENTS

| | | | |
|---|---|---|---|
| 5,826,836 | A | 10/1998 | Gallichan et al. |
| 5,836,776 | A | 11/1998 | Koch |
| 5,964,601 | A | 10/1999 | Tsurumaru et al. |
| 6,086,145 | A | 7/2000 | Wandyez |
| 6,173,933 | B1 | 1/2001 | Whiteside et al. |
| 6,215,518 | B1 | 4/2001 | Scott |
| 6,439,530 | B1 | 8/2002 | Schoenfish et al. |
| 6,542,360 | B2 * | 4/2003 | Koizumi ............... G06F 1/1632 165/80.3 |
| 6,739,792 | B1 | 5/2004 | George, Jr. |
| 6,918,294 | B1 | 7/2005 | Roberge |
| 7,954,894 | B2 | 6/2011 | Schedivy et al. |
| 8,210,861 | B2 * | 7/2012 | Tanis ................ H01R 13/6315 439/248 |
| 8,220,680 | B1 | 7/2012 | Everson et al. |
| 8,292,644 | B2 | 10/2012 | Hamner et al. |
| 8,366,468 | B2 * | 2/2013 | Carnevali ............ G06F 1/1632 439/248 |
| 8,613,385 | B1 | 12/2013 | Hulet et al. |
| 8,782,714 | B2 | 7/2014 | Bird et al. |
| 9,377,672 | B1 | 6/2016 | Clearman et al. |
| 9,535,457 | B1 | 1/2017 | Vier |
| 10,401,925 | B2 * | 9/2019 | Uchino ................ G06F 1/1632 |
| 2009/0068870 | A1 | 3/2009 | Mezhinsky |
| 2010/0138581 | A1 | 6/2010 | Bird et al. |
| 2011/0155873 | A1 | 6/2011 | Montag et al. |
| 2011/0267759 | A1 * | 11/2011 | Abram ................ B60R 11/0235 361/679.27 |
| 2012/0063081 | A1 * | 3/2012 | Grunwald ........... B60R 11/0235 361/679.41 |
| 2013/0208428 | A1 | 8/2013 | Hui et al. |
| 2013/0280953 | A1 | 10/2013 | Radeke et al. |
| 2014/0162490 | A1 * | 6/2014 | Hodge ..................... G06K 7/00 439/487 |
| 2014/0198473 | A1 | 7/2014 | Shah et al. |
| 2015/0296633 | A1 | 10/2015 | Murata et al. |

FOREIGN PATENT DOCUMENTS

| | | |
|---|---|---|
| EP | 1329991 B1 | 12/2007 |
| EP | 2754610 A3 | 10/2014 |
| JP | 10-037915 | 2/1998 |
| JP | 2005318382 A | 11/2005 |
| WO | 2012037126 A1 | 3/2012 |
| WO | 2014/001155 A1 | 1/2014 |

OTHER PUBLICATIONS

Korean Intellectual Property Office, PCT Search Report and Written Opinion, dated Jun. 8, 2017.
Japan Patent Office, Office Action—Notification of Reasons for Rejection, dated Nov. 19, 2019.
European Patent Office, Extended European Search Report, dated Jun. 8, 2020.
Brazil Intellectual Property Office, Office Action, dated Aug. 18, 2020.

\* cited by examiner

DISPLAY UNIT FOR A VEHICLE

This application is a divisional application of U.S. Non-Provisional application Ser. No. 15/272,108, filed Sep. 21, 2016. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is in-vehicle entertainment systems.

BACKGROUND

The background description includes information that may be useful in understanding the present invention. It is not an admission that any of the information provided herein is prior art or relevant to the presently claimed invention, or that any publication specifically or implicitly referenced is prior art.

Modern in-flight entertainment systems have evolved from cabin-wide overhead display systems to individual seat-back units for individual passengers. This evolution can help to make air travel more pleasant by providing a closer, more direct view of the on-screen content and, in many cases, providing selectable entertainment options to the passenger.

These seat-back entertainment solutions pose challenges not present in the cabin-wide overhead display systems. For example, seat-back entertainment solutions require more display units—one for each passenger. As such, with a greater amount of display units there is a higher likelihood of a malfunction, requiring the replacement of malfunctioning or inoperable units. Additionally, because the seat-back entertainment solutions are individual to each passenger and thus unlike the traditional overhead cabin-wide entertainment systems, there are generally no alternative screens for a passenger whose seat-back unit happens to be malfunctioning to view. Therefore, it is of greater importance that a malfunctioning unit be able to be quickly replaced, such as while an aircraft is on the ground between flights.

To address this concern, removable seat-back entertainment systems have been developed. Existing seat-back entertainment systems typically consist of a docking station disposed within the seat back of the seat in front of a particular seat to which the individual entertainment system corresponds, and a removable display unit that docks within the docking station.

While existing removable seat-back entertainment systems are an improvement over the overhead cabin-wide systems, limitations remain within these existing seat-back entertainment solutions.

Existing systems employ various types of release mechanisms to allow the quick removal of a display unit from the docking station by airline personnel. In an attempt to prevent unauthorized removal, some existing systems require special tools that are introduced into openings on the front of the display unit to access a release mechanism. However, the actuation of the release mechanism often only requires a single point of contact to be actuated, and as such the use of the tool can be bypassed by introducing other objects into the openings to actuate the release mechanism. Thus, there is still a need for an easy-to-use latching system that effectively prevents unauthorized removal of the display unit from its docking station.

Another concern with current seat-back entertainment systems is the risk that, in the event of extreme turbulence, a hard landing, or a crash, the docked display unit can become partially or fully dislodged and pose a projectile hazard to passengers. Similarly, if in such a situation the display unit is impacted by an object (e.g., the passenger's body or other objects that are tossed around the cabin), the impact can cause the display unit to be partially or fully dislodged from the docking station. Even if only partially dislodged, the installation of existing systems is such that a partial failure is likely to cause the display unit to swing upward, potentially striking a passenger's head or body. Thus, there is still a need for a secure engagement system that is easy to use and provides protection against undesired removal or separation of the display unit from its docking station.

Existing systems also lack a secure way to ensure proper installation before supplying current from the docking station to the removable display unit. Providing current to an uninstalled or misinstalled display unit can cause damage to the display unit and the docking station, and is a shock hazard for the installing personnel as well as passengers.

Existing systems generally require a very precise alignment of the display unit with the docking station in order to be properly installed, without tolerances for misalignment. As such, quick installation by service personnel is difficult and cumbersome. Additionally, due to this precise alignment requirement, existing systems are rendered inoperable and need to be taken offline for repair or replacement if the connector interfaces of the removable display unit and/or the docking station are taken out of alignment due to normal wear and tear, misuse, improper installation, or other damage.

Existing systems typically are limited in their heat-management solutions. As displays and the processors and other components used in the display units become faster and more powerful, they will generate more heat and thus will require improved heat management solutions.

Thus, there is still a need for a seat-back entertainment system that addresses these additional limitations of existing solutions.

SUMMARY OF THE INVENTION

The inventive subject matter provides apparatus, systems and methods in which a removable display unit of a seat-back entertainment system can be easily and securely installed and removed from a docking station, prevents accidental removal or dislodging (such as in the case of turbulence or aircraft accident), accounts for potential causes of misalignment between the docking station and display unit, provides for improved current control, and provides for improved heat management and dissipation.

Embodiments of the inventive subject matter include an attachment or latching system comprising a rotating butterfly latch having a body that is movable to cause the actuation of a release mechanism that secures and releases a removable display unit to and from a docking station. In embodiments, the body can rotate about a rotational element whereby the rotation of the body from a first position (locked) to a second position (unlocked) causes the release mechanism to release. The butterfly latch also includes a latch head rotationally coupled to the body such that the latch head can rotate around the body about a second axis of rotation. The latch head includes contact points disposed such that actuating only one of the contact points (or more than one contact point unequally) causes the latch head to rotate about the body rather than cause movement of the body, and thus will not cause the body to move and actuate the release mechanism. The attachment system also includes a cover in front of the body and latch head. The cover includes perforations aligned with the contact points of the latch head. Thus, when the display unit is installed within a docking station, the contact points can only be accessed via the perforations, such as via a tool having prongs spaced and dimensioned to align with the prongs and of sufficient length to actuate the contact points to cause the body to rotate. This cover can be the upper portion of the display unit itself.

Embodiments of the inventive subject matter include a multi-point (preferably three-point) engagement system. The preferred three-point engagement system includes first and second hinge hooks extending from the rear of the display unit, the hinge hooks curved towards the front of the display unit, and a display attachment mechanism at an upper side or rear of the display unit. The three-point engagement system also include corresponding hinge loops on the docking station that are arranged to receive the hinge hooks and a corresponding docking attachment mechanism that can couple with the attachment mechanism of the display unit.

In some embodiments, the system can also include alignment tabs on the docking station and corresponding alignment surfaces on the display unit that help align the display unit with the docking station during installation. Additionally, the display unit can have display alignment members that include the alignment surface. The display alignment members can be cavities having side, top, and/or bottom surfaces and be dimensioned to receive the corresponding alignment tabs of the docking station. The engagement of the alignment tabs within the alignment members prevents lateral movement of the display unit relative to the docking station. Thus, in these embodiments, the hinge loops of the docking station do not have to be dimensioned to precisely fit the hinge hooks. Instead, the hinge loops can have larger lateral dimensions than the hinge hooks such that during installation, the hinge hooks can have a degree of lateral movement within the hinge loops. The thickness of the hinge hooks and the corresponding dimensions of the hinge loops in a "vertical" direction (e.g., forward-backward direction that is offset and preferably approximately perpendicular to the lateral directions; can be considered to be the direction towards the front or rear of the docking station and/or the display unit) is such that the hinge hooks are not able to travel forward or backward when installed within the hinge loops. Preferably, the dimensions of the hinge hooks and hinge loops are such that the hinge hooks and corresponding hinge loops are in contact when the display unit is installed within the docking station.

In some embodiments, the display and dock attachment mechanism can comprise the butterfly latch engagement mechanism.

In some embodiments, the hinge hooks are made of thermally-conductive material and thermally coupled with a heat sink of the display unit. The corresponding hinge loops are similarly made of a thermally-conductive material and thermally coupled to a thermally-conductive element of the docking station, such as a rear plate of the docking station. Thus, the hinge hooks and hinge loops can assist with heat-management via the use of the docking station itself to provide heat-dissipation functions.

Embodiments of the inventive subject matter include a current control system that includes a connection or interface component (e.g., one half of a connection interface such as a pin connection interface, etc.) and a contact point on the docking station and a corresponding connection or interface component (e.g., the other half of a connection interface such as a pin connection interface, etc.) and a current control pin on the removable display unit.

The corresponding connection components of the docking station and display unit arranged such that they come into engagement during the installation of the display unit within the docking station. This connection interface can be a data connection interface, video connection interface, etc., and may or may not include power distribution functions.

The current control pin of the display unit is arranged to align with the contact point of the docking station. The current control pin includes an inner contact pin affixed to the rear of the display unit, with a spring that fits around the contact pin at one end and inside of an inner cavity of a contact pin at the other end, such that exertion of a force on the contact pin causes the spring to compress and the contact pin to travel towards the inner contact pin, ultimately causing the inner contact pin to come into contact with the inner cavity of the contact pin. This contact of the inner contact pin with the contact pin enables current flow from the docking station to the display unit.

The dimensions of the various components of the current control pin, as well as their arrangement, are such that the connection components of the docking station and display unit will come into engagement during installation of the display unit before the contact pin comes into contact with the inner contact pin. As such, current is not supplied to the display device until the connection components are properly engaged.

Embodiments of the inventive subject matter include a floating connector dock system wherein the connector interface of a docking station can be afforded a small measure of lateral movement to accommodate a measure of misalignment of the corresponding connector interface of the removable display unit (e.g., due to wear-and-tear, abuse, damage, inaccurate installation, etc.). In these embodiments of the inventive subject matter, the docking station includes one or more guide pins extending outward from a rear panel. These guide pins pass through perforations of a connector interface plate that has the connector interface, these perforations dimensioned to be larger than the cross-sectional area of the guide pins by a set tolerance amount. The system includes springs (e.g., disk springs) disposed around the guide pins between the base plate and the connector interface plate, which exert a force on the connector interface plate in a forward direction, thus preventing impact of the connector interface plate with the rear plate.

The connector interface plate also includes one or more dock alignment tabs that, when brought into contact with a corresponding alignment mechanism of the display unit, brings the connector interface into alignment with a corresponding connector interface of the display unit by causing the corresponding lateral movement of the connector interface plate.

In embodiments, the system also includes a front plate that is statically fixed to the rear plate, covering the connector interface plate. The connector interface plate is thus largely enveloped in the space between the rear plate and the front plate, and biased against the front plate by the springs. The front plate includes an opening that allows access to the connector interface and dock alignment tabs for connection, the opening being dimensioned to be larger than the area needed for the connector dock and dock alignment tabs by at least the tolerance amount of the guide pins and perforations of the connector interface plate. In other words, the front plate include an opening that allows for access to the connector interface and dock alignment tabs even if the connector interface plate moves laterally by the tolerance amount afforded by the relative sizes of the guide pins and corresponding perforations of the connector interface plate.

Embodiments of the inventive subject matter include one or more leaf springs extending from the rear of the display unit. The leaf springs are made of a thermally-conductive material and are thermally coupled to a heat sink of the display unit. The leaf springs are dimensioned such that when the display unit is installed in the docking station, the leaf springs are in contact with a thermally-conductive element of the docking station (for example, the rear plate made of a thermally-conductive material). As such, the leaf springs can transfer heat for dissipation to the docking station, thus sharing the heat management load.

In embodiments, the attachment mechanisms used to secure the display unit within the docking station can similarly be made of thermally-conductive materials and be correspondingly thermally-coupled to the heat sink of the display unit and the thermally-conductive element of the docking station. Contemplated suitable attachment mechanism can include the hinge hooks and hinge loops described in embodiments of the inventive subject matter.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The description herein includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figures 1A, 1B, 1C:
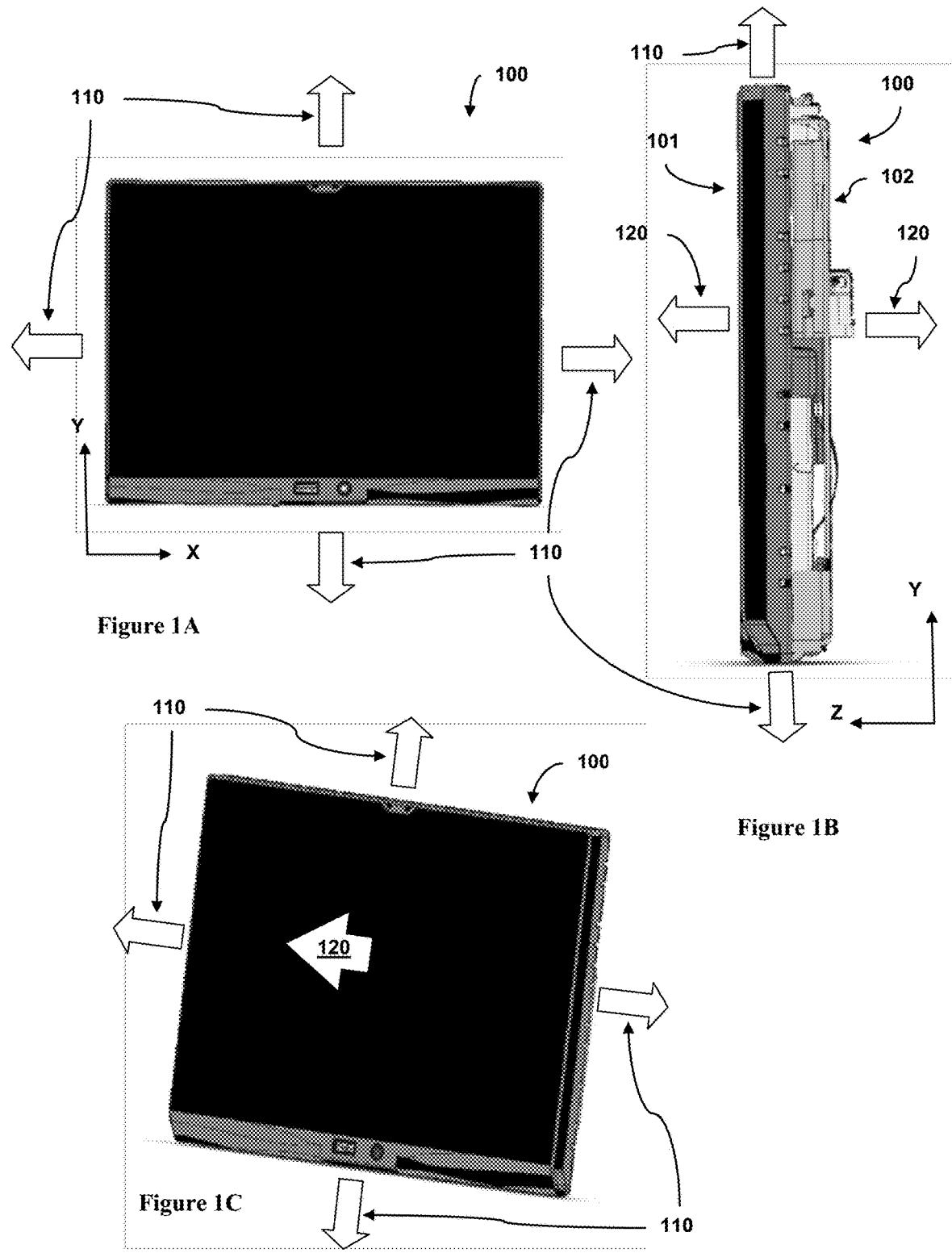
FIGS. 1A-1C are front, side and isometric views of the combined removable display unit and docking station with references to relative directions.

For the purposes of clarity and understanding, FIGS. 1A-1C are provided to provide a reference for the terminology discussed herein regarding directions relative to the seat-back entertainment system discussed. FIGS. 1A-1C provide front, side, and isometric views of the combined removable display unit 101 (which may also be referred to herein as a "seat-back unit", "removable unit" or some variation or combination thereof) and base or docking station 102 of the inventive subject matter (collectively referred to as entertainment system 100).

The illustrative examples of the various aspects of the inventive subject matter discussed within make references to a display unit 101/1000, showing a video display unit to be installed within docking station 102/1100. It should be understood that the references to display unit 101/1000 are not intended to limit the inventive subject matter to removable seat-back units having video capabilities alone. Rather, it should be understood that the display unit discussed and shown herein is an example of a suitable removable unit incorporating the described aspects of the inventive subject matter. As such, mentions of "display unit" are intended to also include other seat-back units that would benefit from the inventive subject matter whether they have video and/or audio output capabilities or not, such as other removable modular seat-back units that may require a data and/or power feed from the docking station. Examples can include computing devices (with our without video/audio output), media storage units such as server storage units, networking units, video game consoles, etc.

References herein to "seat back" units are not intended to limit the installation to the backs of airplane seats. The systems and methods of the inventive subject matter can be applied to any applicable structures or supports (e.g., front-of-cabin dividing structures, fixed walls, etc.) whereby a docking station can be installed to receive a display unit.

The directions indicated by the arrows 110 of the front view of FIG. 1A are referred to herein generally as "lateral" directions (along the X and Y axis). The side view of FIG. 1B illustrates the "vertical" directions indicated by arrows 120 (along the Z axis). Vertical directions 120 can be considered to be those that are "towards the front" or "towards the rear" of the seat-back entertainment system 100. The vertical directions 120 can also be considered to refer generally to the direction of installation and removal of the removable display unit from the docking station, as installation involves a direction toward the docking station generally and removal involves a direction away from the docking station generally. Lateral directions 110 can be generally considered to be those that are approximately perpendicular to the "vertical" direction indicated by arrows 120, as shown in the side view of FIG. 1B. In the embodiments illustrated herein, the lateral directions 110 are also approximately parallel to the plane of the display screen and rear side of the display unit, and/or the back plate of the docking station.

A) Rotating Latch Butterfly Mechanism

In order to facilitate the easy removal of a removable display unit by authorized personnel, while preventing accidental removal or removal by unauthorized personnel, the seat back unit's release mechanism can incorporate a rotating latch butterfly release, according to embodiments of the inventive subject matter.

Figure 2:
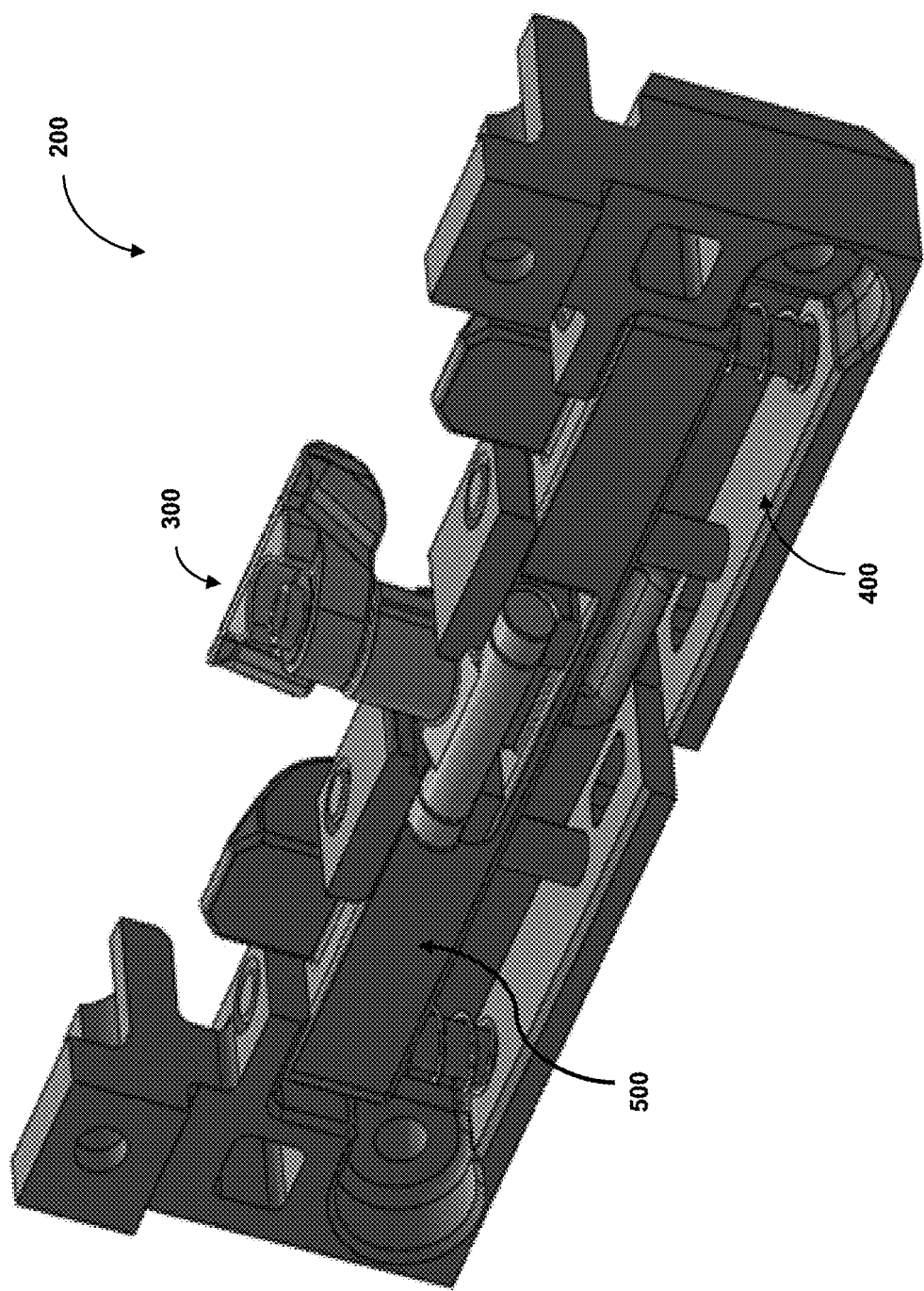
FIG. 2 provides a view of a rotating latch butterfly assembly of the removable display unit, according to embodiments of the inventive subject matter.
Figure 3A:
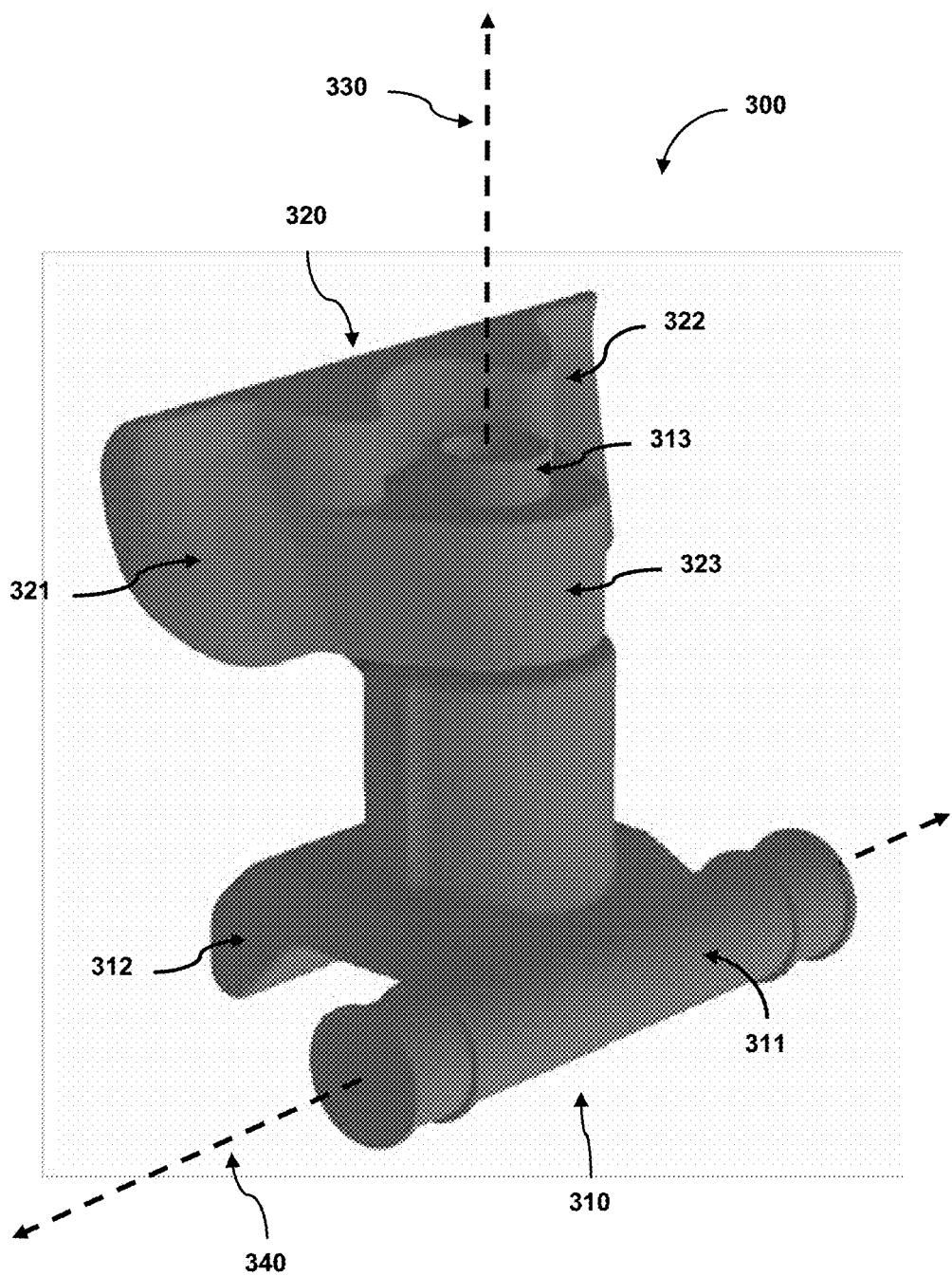
FIG. 3A provides an isometric isolated view of latch butterfly, according to embodiments of the inventive subject matter.
Figure 3C:
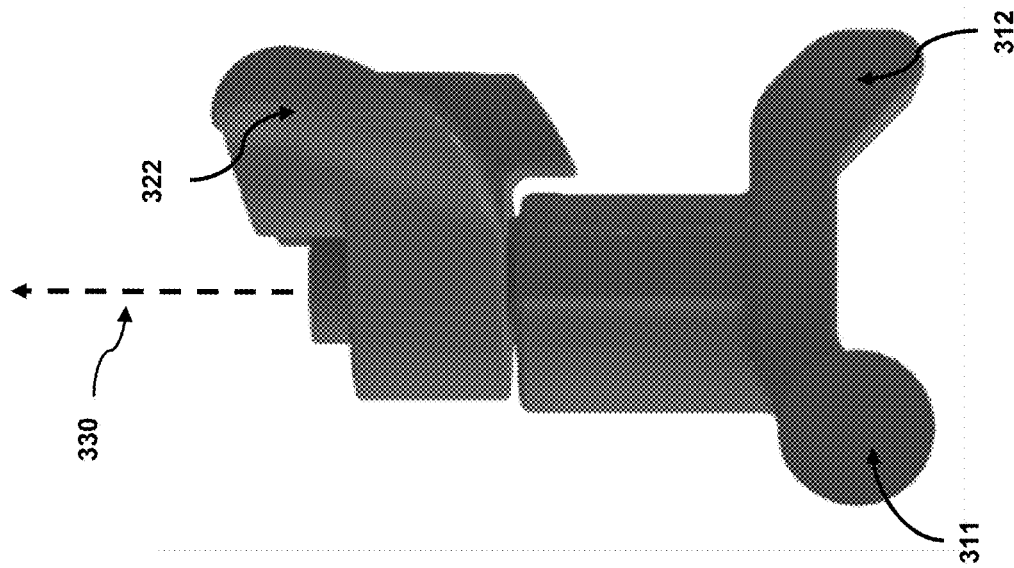
FIGS. 3B and 3C provide a front view and a right-side view of the latch butterfly, respectively, according to embodiments of the inventive subject matter.
Figure 3B:
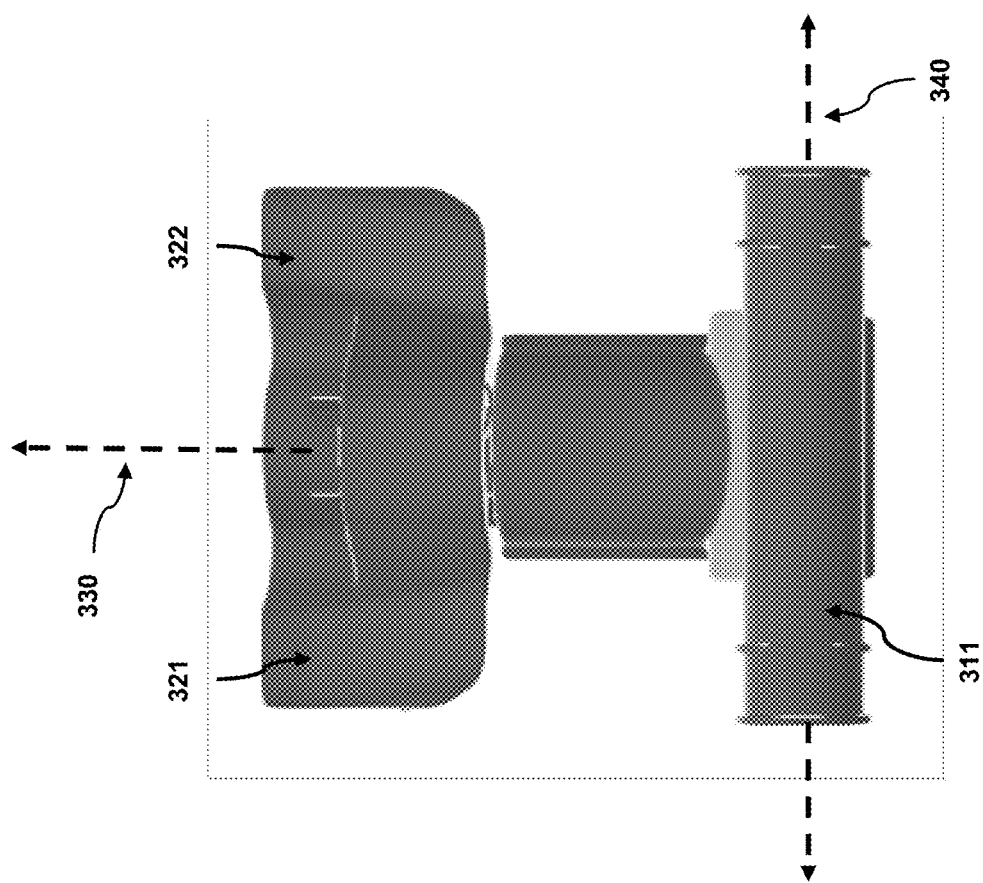

FIG. 2 is an illustrative example of a rotating latch butterfly assembly 200 of the removable display unit 101, according to embodiments of the inventive subject matter. As seen in FIG. 2, the assembly 200 includes a latch butterfly 300 disposed within a frame 500. Assembly 200 also includes latch 400 movably coupled with frame 500, in position to be actuated by the latch butterfly 300. The latch butterfly 300, latch 400, and frame 500 are described in greater detail below:

FIG. 3A provides an isometric isolated view of latch butterfly 300. FIGS. 3B and 3C provide a front view and a right-side view of the latch butterfly 300, respectively. As seen in FIG. 3A, latch butterfly 300 includes a body 310, and a latch head 320 rotatably coupled to the body 310.

The body 310 includes a rotational element 311, actuation tab 312, and a rotational coupling element 313.

Figure 7:
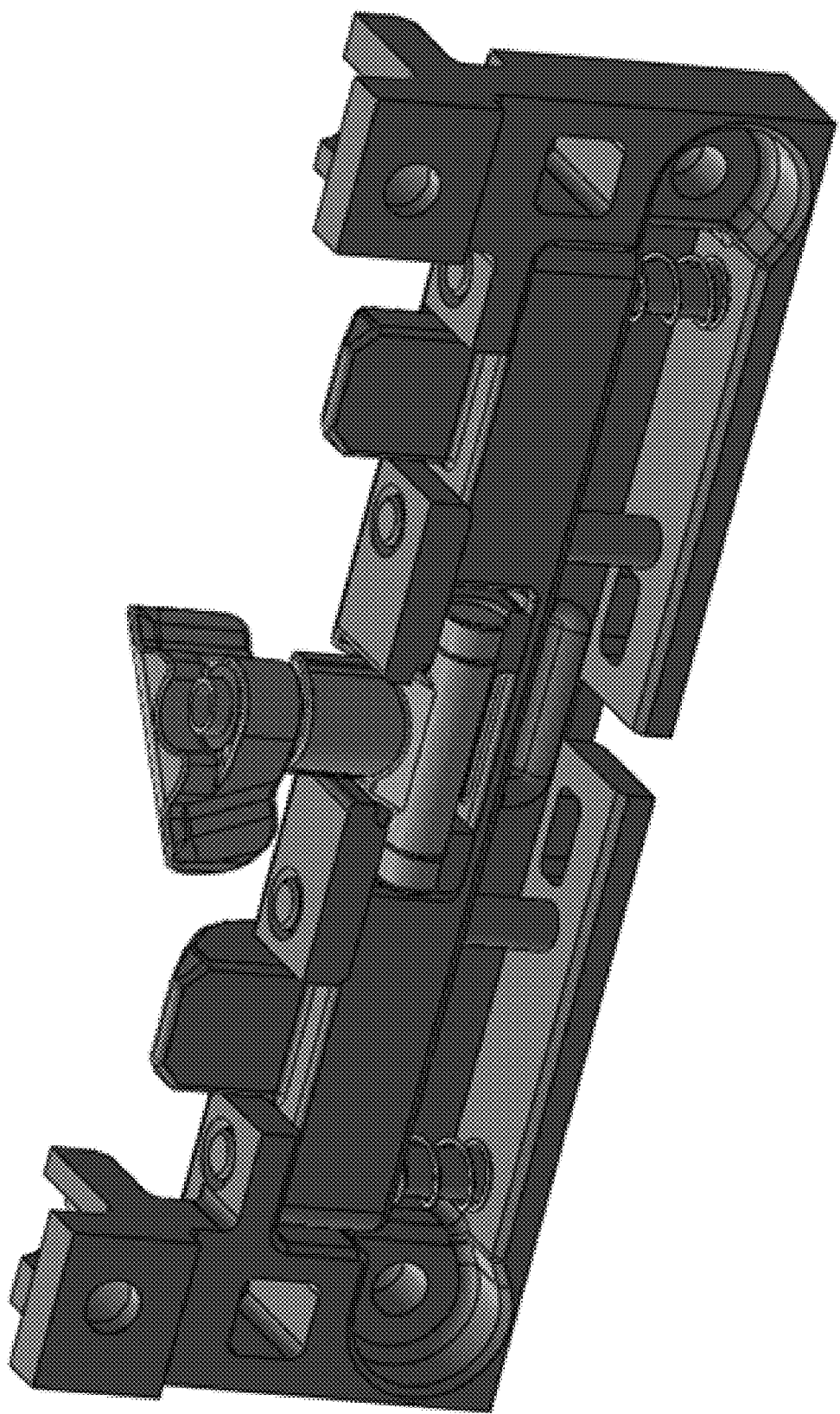
FIG. 7 illustrates the free rotation of the head component of the latch butterfly, according to embodiments of the inventive subject matter.

The latch head 320 includes a first contact point 321, a second contact point 322, and a rotational coupling element 323. In FIGS. 3A-3C, the first contact point and second contact points 321, 322 are shown as tabs extending from the center of latch head 320. As shown in FIGS. 3A-3C, rotational coupling element 323 couples with rotational coupling element 313 of body 310 such that the latch head 320 is capable of rotating about the vertical axis of rotation 330. The first and second contact points 321, 322 are positioned on opposite sides of the axis of rotation 330. Thus, if a force is applied to one of the contact points without an equal force applied to the other contact point such that the resulting torques are unequal, the latch head 320 will rotate freely about the axis of rotation 330. This result is illustrated in FIG. 7.

Figure 4A:
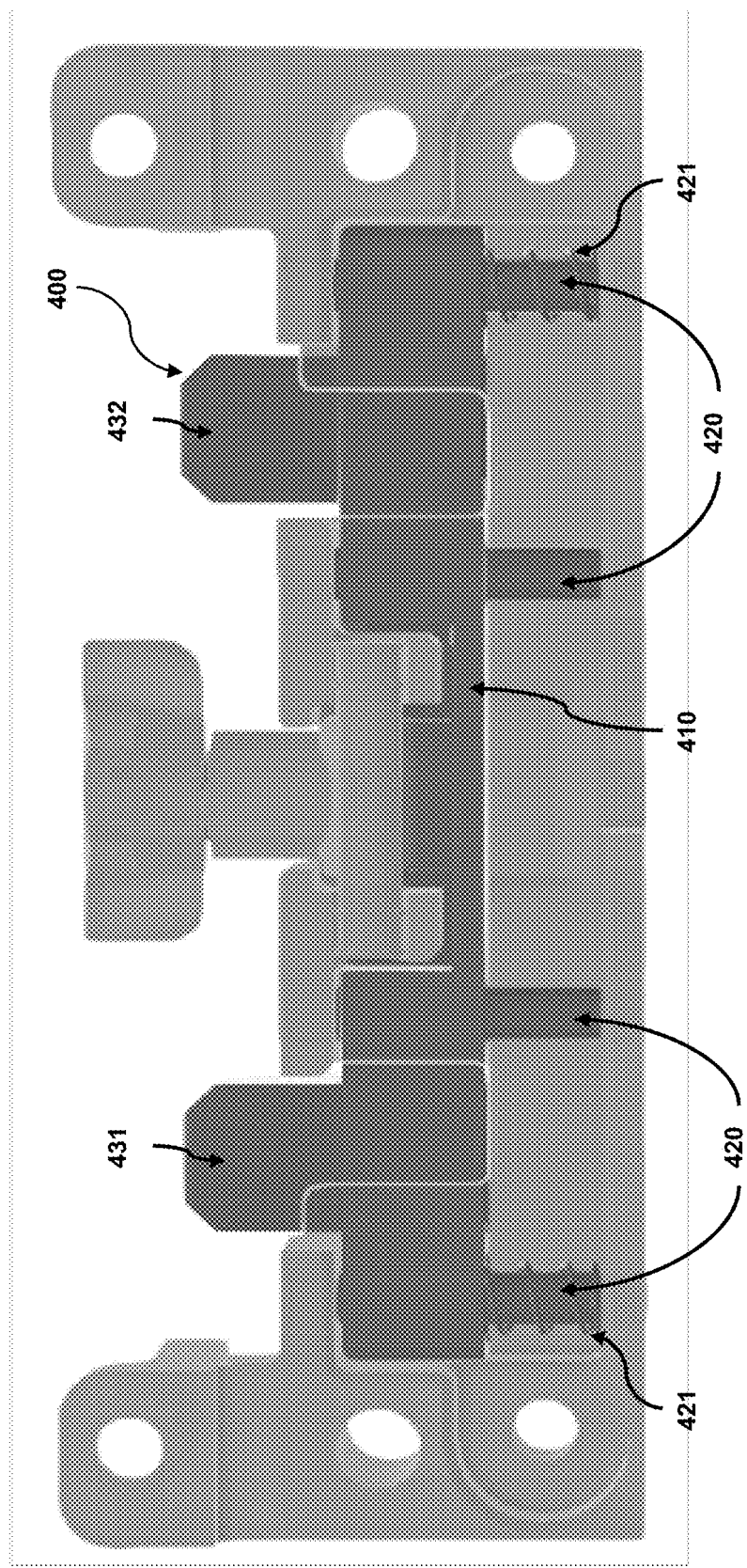
FIG. 4A provides a front view of the assembly highlighting the latch component, according to embodiments of the inventive subject matter.

FIG. 4A provides a front view of the assembly 200, highlighting the latch 400 in the darker shading. As seen in FIG. 4A, latch 400 includes a latch body 410, with two latch tabs 431, 432 projecting from the latch body 410. The latch 400 is movably coupled to the frame 500 via guide posts 420, which are fixably attached to the frame 500 and run through latch body 410 via corresponding openings. Thus, latch body 410 can move along the length of guide posts 420 within the frame 500. The latch 400 also includes springs 421, shown disposed about two of the guide posts 420. Springs 421 are compression springs, thus without a force acting against them, springs 420 exert a force on latch body 410 such that it is in the "locked" or "attached" position shown in FIG. 4A ("upward" on the page, in a positive Y direction). The latch 400 can be considered to be a release mechanism, as the movement thereof causes the release of the display unit from the docking station.

Figure 4B:
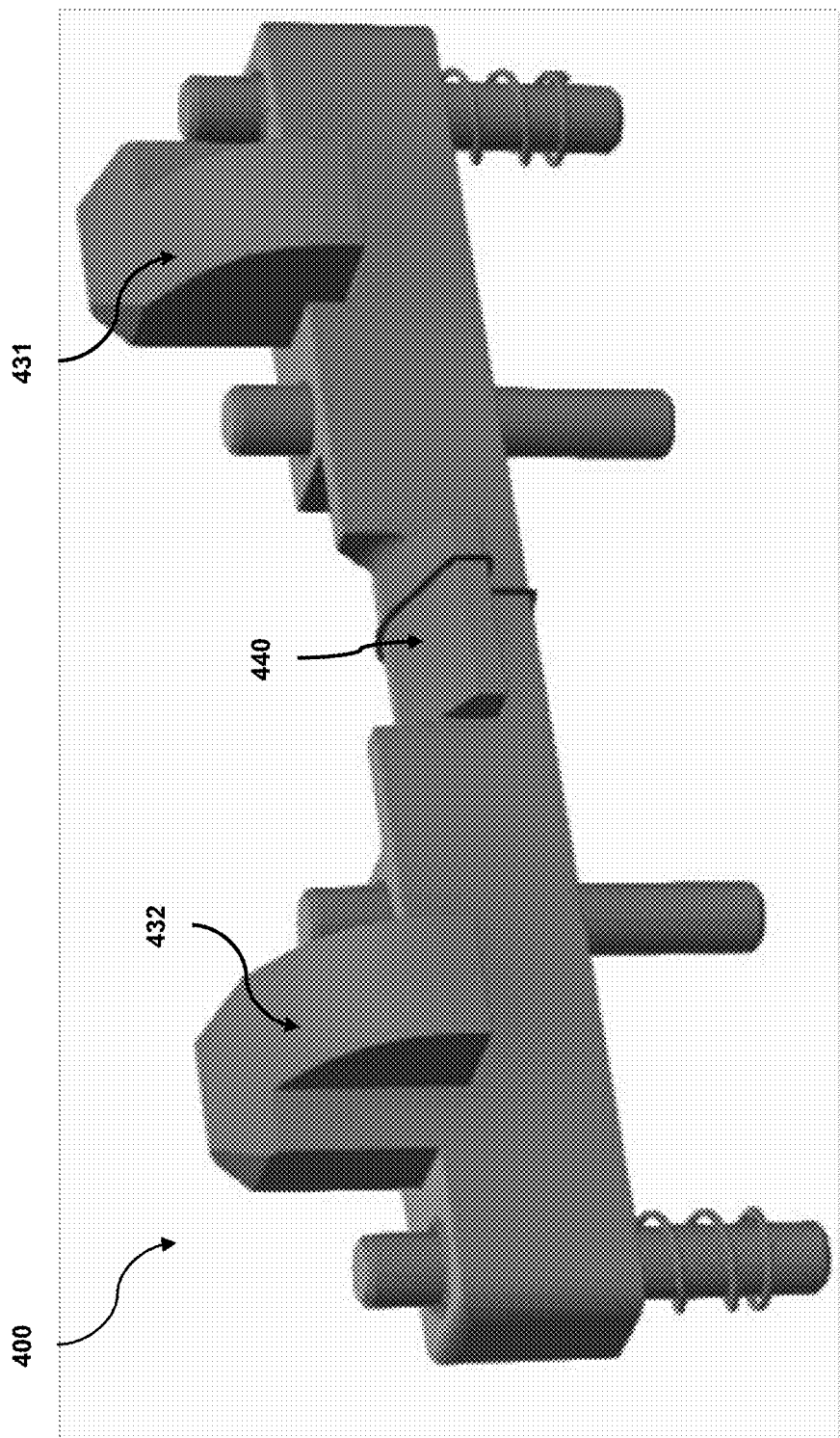
FIG. 4B provides an isolated view of the latch component from an isometric rear perspective showing the actuation surface and the rear shape of the latch tabs, according to embodiments of the inventive subject matter.

FIG. 4B provides an isolated view of the latch 400 from an isometric rear perspective, showing the rear shape of the latch tabs 431, 432 as well as the actuation surface 440. The curved rear shape of latch tabs 431, 432 allow for the display unit 101 to be docked within docking station 102 without requiring the actuation of the latch 400 via the latch butterfly 300. During installation, the contact of the latch loops 451, 452 with the curved surfaces of the corresponding latch tabs 431, 432, will push the latch tabs 431, 432 downward. Once the latch tabs 431, 432 clear the rims of the latch loops, the lack of resistance from the latch loops will allow springs 421 to push the latch body 410 (and thus, the latch tabs 431, 432) upward to the locked position within the latch loops 451, 452, thus securing the display unit 101 properly with the docking station 102.

Figure 5:
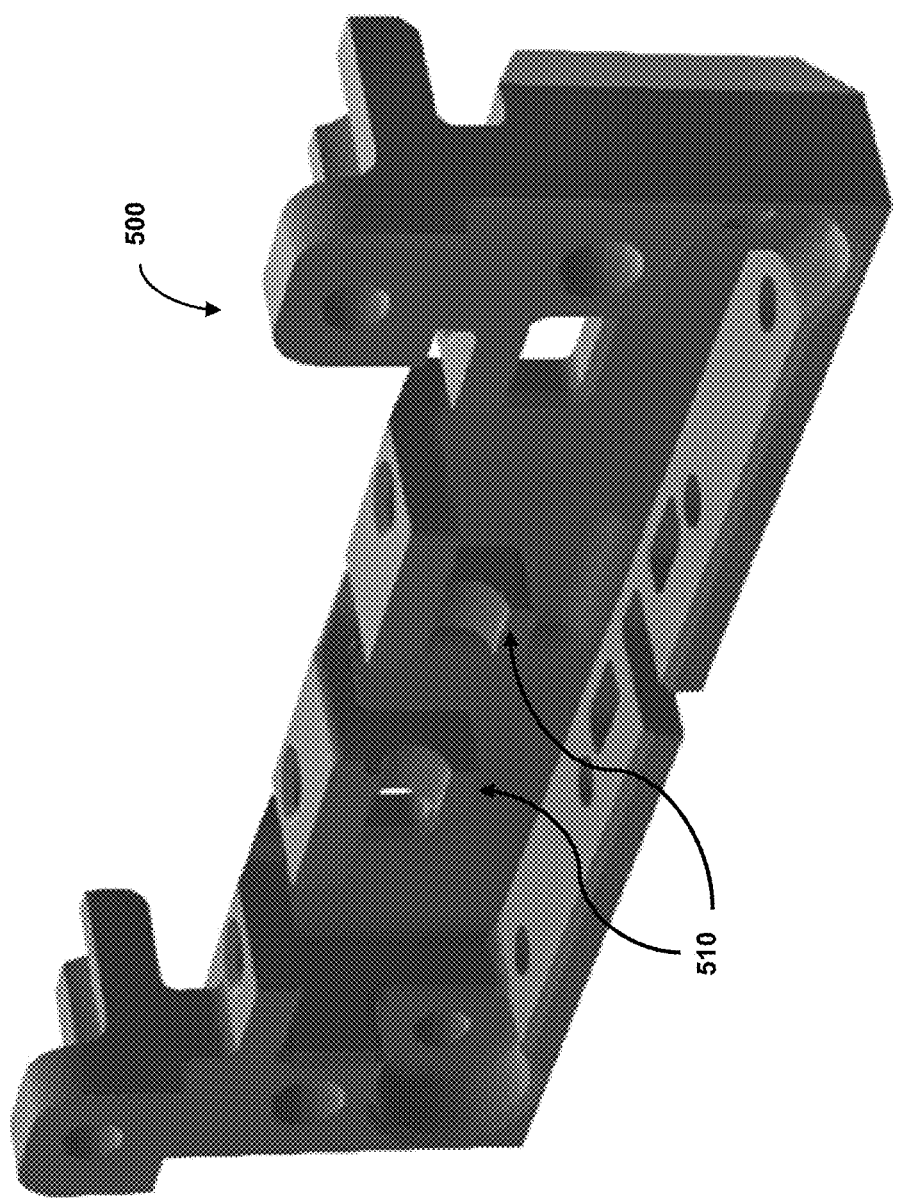
FIG. 5 provides an isolated view of the frame component from an isometric perspective, according to embodiments of the inventive subject matter.
Figure 6:
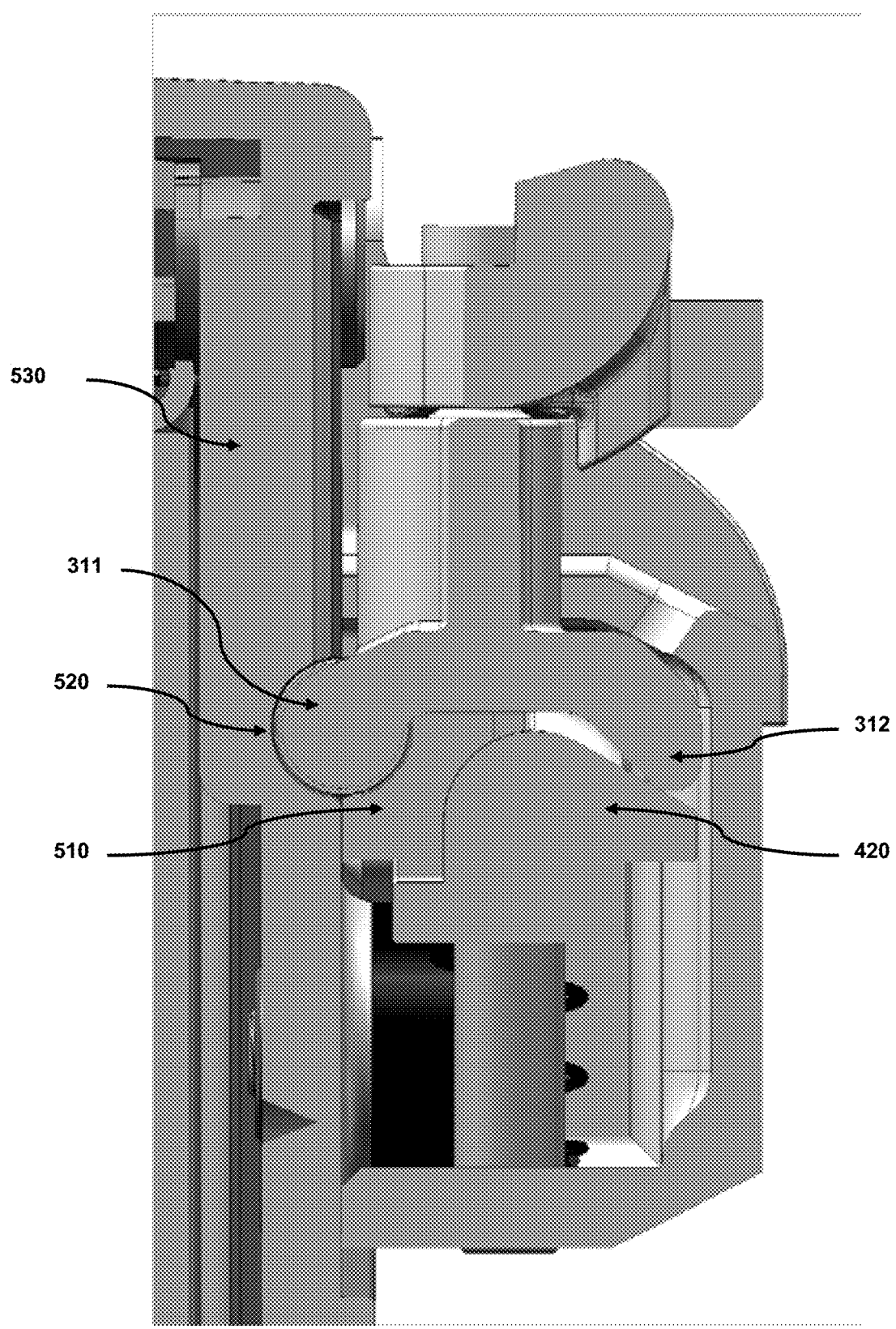
FIG. 6 provides a cutaway view of the rotating latch butterfly assembly in a locked position, according to embodiments of the inventive subject matter.

FIG. 5 provides an isolated view of frame 500, from an isometric perspective. As seen in FIG. 5, frame 500 includes two projecting elements 510 having curved inside surfaces that are dimensioned to fit the rotational element 311 of the latch butterfly 300, allowing for the rotation of the latch butterfly 300 in a rear-ward direction when force is applied to the tabs 321, 322 as described herein. In the embodiment shown in FIG. 5, the projecting elements 510 are of a length to form a portion of the curved surfaces that define the cavity that will house the rotational element 311. In these embodiments, the remaining sections of the cavity can be formed by a section 520 on the back plate 530 of the display unit 101, as shown in FIG. 6. Thus, when assembled, the full cavity is formed that can rotatably house the rotational element 311. This configuration provides easy, secure assembly of the cavity and rotational element 311 by eliminating the need to leave space for separate installation of the rotational element 311 in a fully-formed cavity, which can be difficult, cause component damage, and increase the chances of an undesired removal of the rotational element 311 from the cavity once assembled. In other embodiments, the projecting elements 510 can be of a size such that the majority or even entirety of the cavity is formed by the curved surfaces of the projecting elements 510 themselves, without requiring a complementary component with the remainder of the curved surface to form the cavity.

FIG. 6 provides a cutaway view of the assembly 200, in a locked position. In order to actuate the latch 400 and release the display unit 101 from the docking station 102, the latch butterfly 300 is made to rotate about axis of rotation 340 via the engagement of both contact points 321,322 in a rearward direction. This rotation causes actuation tab 312 to exert a downward force on a corresponding actuation surface 420 of latch 400, causing latch body 410 (and thus, latch tabs 431, 432) to move downward (e.g., toward a release position). A sufficient downward movement of latch tabs 431, 432 (e.g., reaching the release position) results in the latch tabs 431, 432 becoming disengaged from the corresponding latch hoops 451, 452 of the docking station 102, thus freeing the display unit 101 from the docking station 102.

When a force is no longer applied to the contact points 321, 322, the force exerted by compressed springs 421 pushes the latch body 410 back upwards. As the latch body 410 moves upward, the actuation surface 420 will push on actuation tab 312, causing the latch butterfly 300 to rotate towards forwards to the default "locked" position.

Figure 8:
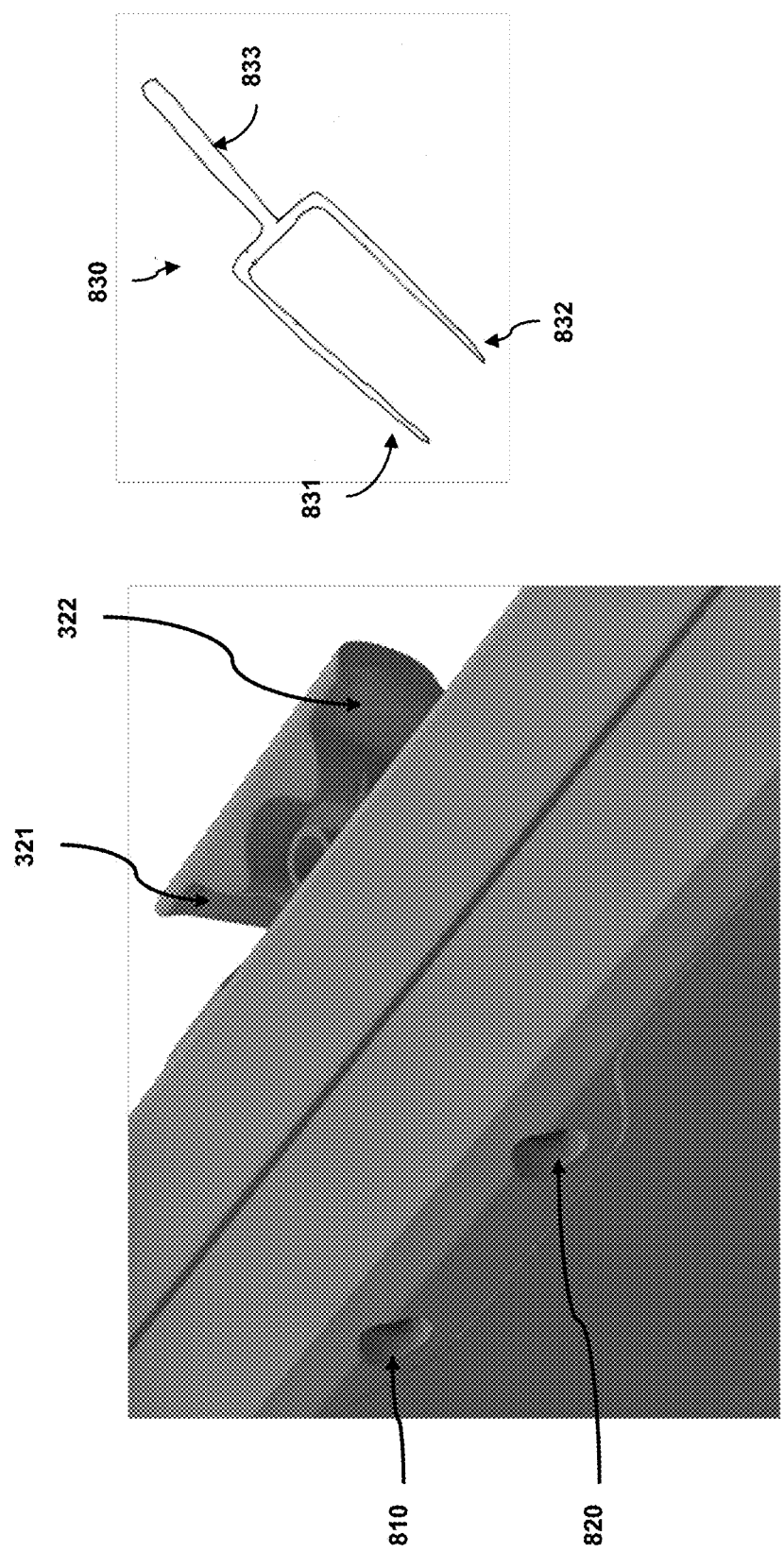
FIG. 8 shows the latch key holes and the latch key, according to embodiments of the inventive subject matter.

In seat-back entertainment systems and other similar installations, the docking station is installed within the seat (or other structure) such that when the display unit 101 is installed, the front side of the display unit 101 is flush or nearly flush with the surrounding structure (e.g., seat-back, cabin-dividing wall, etc.). Thus, when the display unit 101 is installed with docking station 102, the combined structure of the display unit itself 101 as well as the structure housing the docking station prevent direct access to the latch butterfly 210. In order to actuate the latch butterfly 210 when the display unit 101 is installed with docking station 102, the display unit 101 includes latch keyholes 810 and 820, as shown in FIG. 8. The latch keyholes 810 and 820 line up with the first contact point 321 and 322, respectively. The contact points 321, 322 are thus accessed for actuation via the respective keyholes 810 and 820 by the use of an unlock tool, such as latch key 830 (shown in FIG. 8, for illustrative purposes and not intended to be interpreted as being to scale) having prongs 831 and 832 that align with and can be inserted into the keyholes 810 and 820. The prongs 831, 832 of the latch key 830 are arranged such that when they are inserted into the keyholes 810 and 820, the prongs make contact with and thus can exert force on both of the contact points 321, 322. As shown in the illustrative example of FIG. 8, the latch key 830 can also include a handle 833.

Thus, as the latch key 830 is pushed such that the prongs proceed further in the direction of insertion, the torques exerted by both prongs on each of the contact points 321, 322 cancel each other out, preventing rotation of the latch butterfly 210 about axis of rotation of 330. Thus, the balanced force exerted on the contact points 321, 322 by the latch key pushes the latch head 320 inward, causing it to rotate about axis of rotation 340, thereby actuating the latch 400 as discussed above to release the display unit 101.

Because both contact points 321, 322 must be actuated simultaneously to actuate the latch 400, an unauthorized party cannot remove the display unit 101 by introducing a single element into one of the keyholes 810, 820. As such, unauthorized removal of the display unit 101 is prevented.

In most embodiments (such as the one illustrated herein), the prongs will be of equal length because the contact points 321, 322 are symmetrical about axis of rotation 330. However, it is contemplated that if contact points 321, 322 are not symmetrical, the lengths of the prongs are such that when inserting the prongs into keyholes 810, 820, both of the contact points 321, 322 can be actuated simultaneously. The prongs are of a sufficient length to reach the contact points 321 and 322, and also to account for the travel of the contact points when the latch butterfly 210 rotates about axis of rotation 340 sufficiently to cause latch tabs 431, 432 to disengage from the corresponding latch loops of docking station 102.

Figure 9:
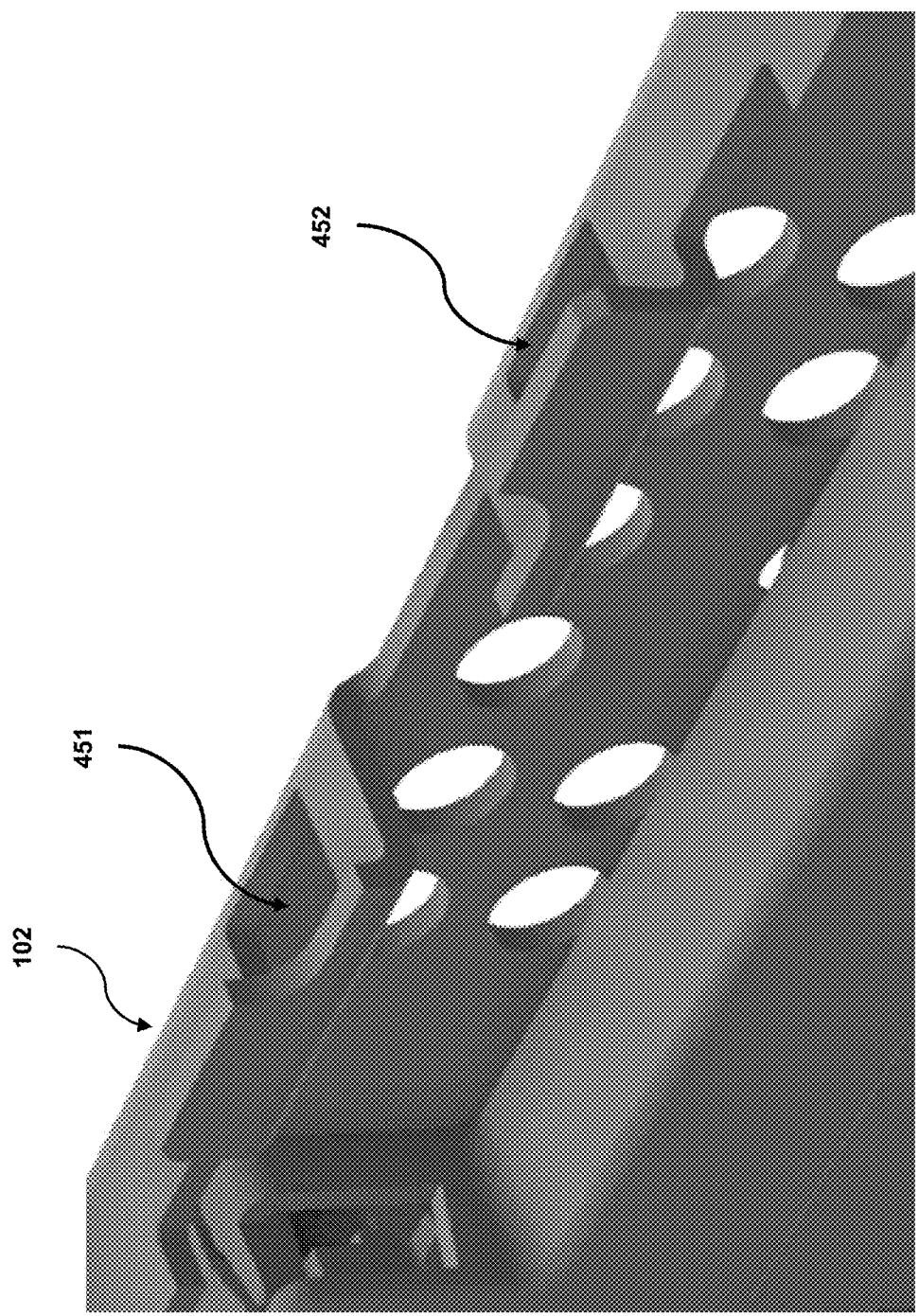
FIG. 9 provides a detailed view of the latch hoops of the docking station, according to embodiments of the inventive subject matter.

FIG. 9 provides a detailed view of the latch hoops 451, 452 of docking station 102, that receive the latch tabs 431, 432, respectively, when the display unit 101 is installed within docking station 102.

B) Three-Point Engagement Docking System

Figure 10A:
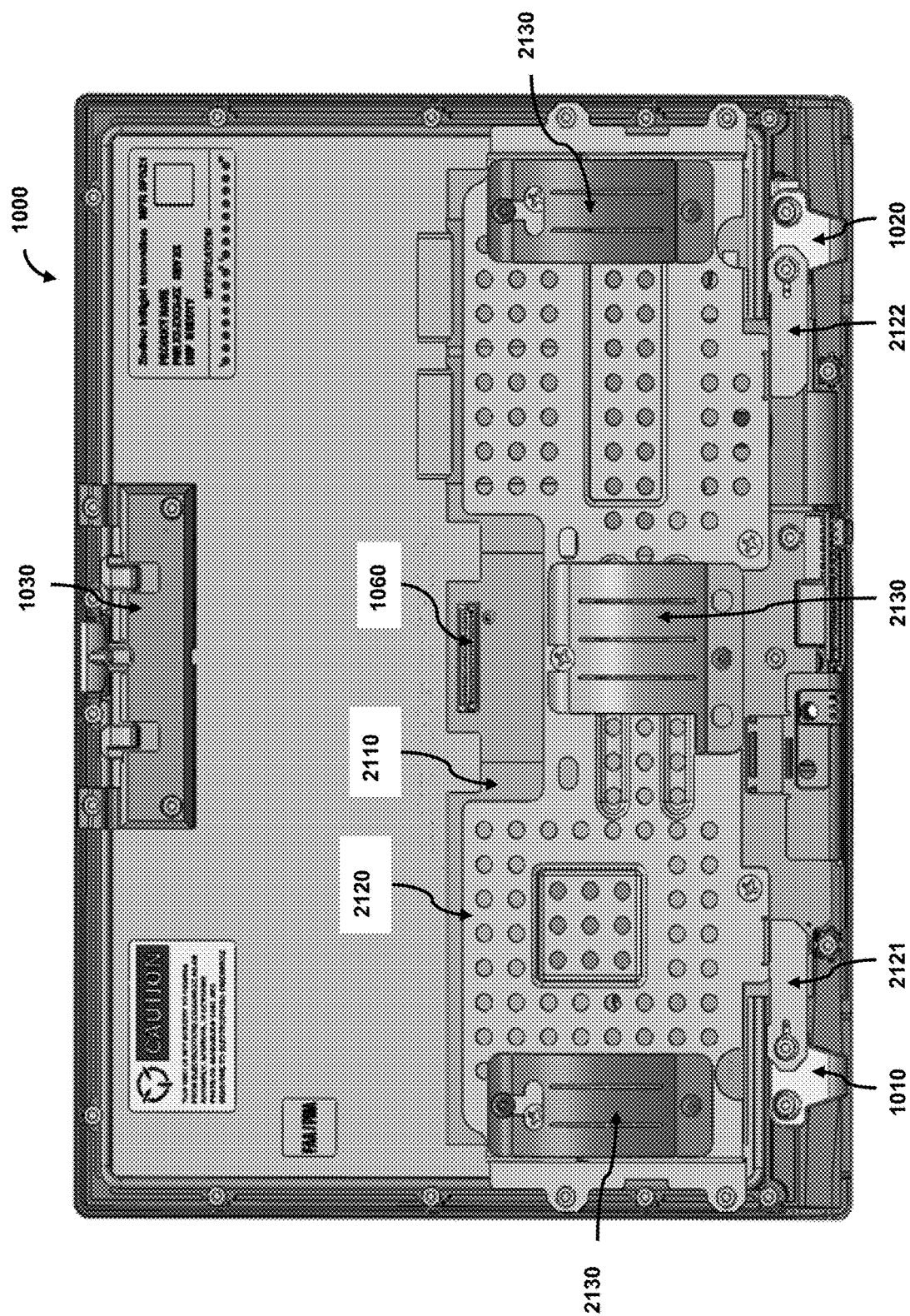
FIGS. 10A and 10B provide an illustration of a removable seat-back display unit and docking station, respectively, incorporating the three-point engagement docking system, according to embodiments of the inventive subject matter.
Figure 10B:
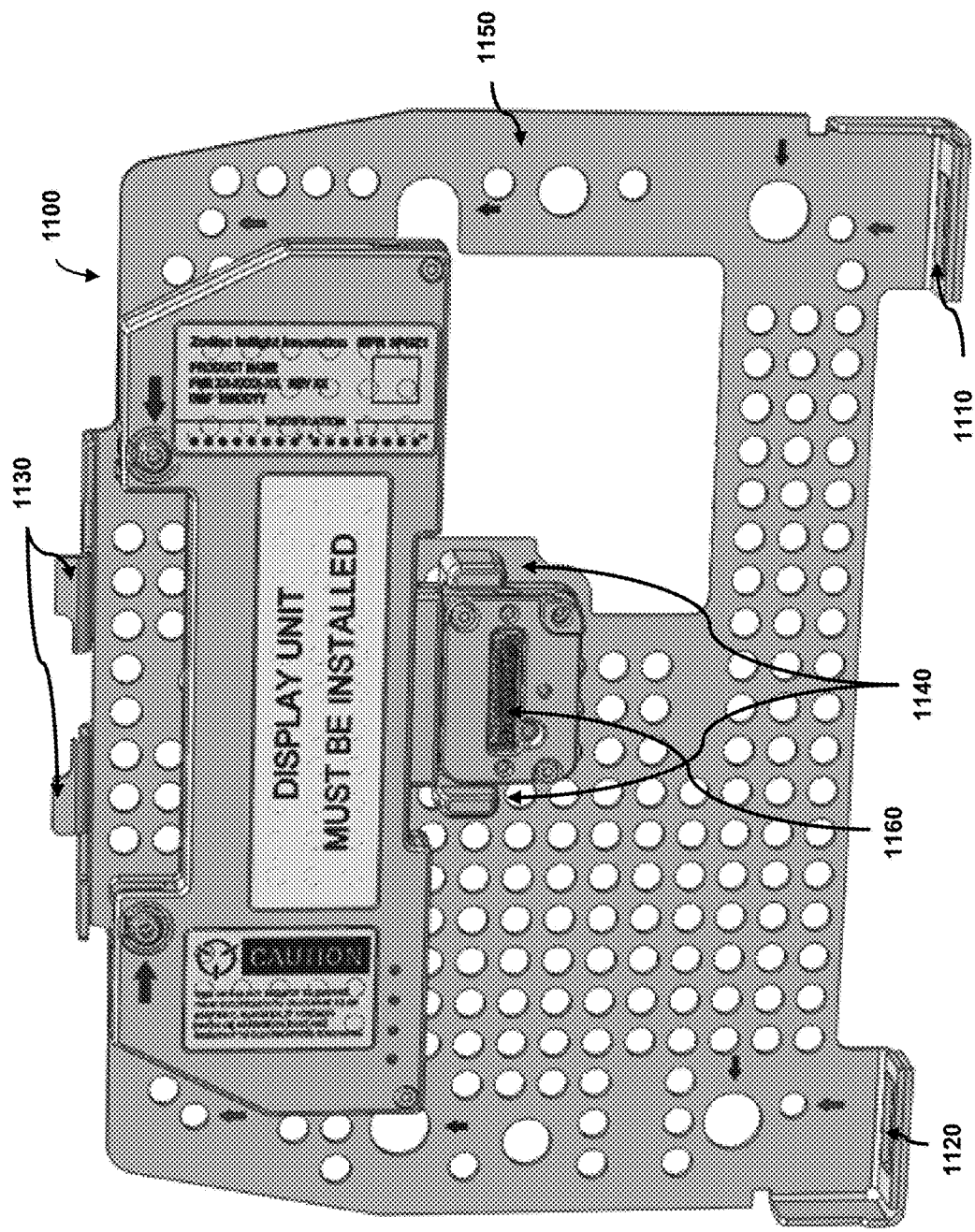

FIGS. 10A and 10B provide an illustration of a removable seat-back display unit 1000 and docking station 1100, respectively, that incorporate the three-point engagement docking system of embodiments of the inventive subject matter. As seen in FIG. 10A (depicting the rear or back side of display unit 1000), the display unit 1000 includes hinge hooks 1010 and 1020, and a display attachment mechanism 1030. Docking station 1100, in turn, has hinge loops 1110 and 1120 corresponding to hinge hooks 1010 and 1020, respectively, and a docking attachment mechanism 1130 corresponding to display attachment mechanism 1030, as shown in FIG. 10B. The display attachment mechanism 1030 and corresponding docking attachment mechanism 1130 can be collectively referred to for the discussion of the three point engagement docking system embodiments as the attachment mechanism or latch mechanism 1031.

In embodiments, such as the one illustrated in the discussion herein, the latch mechanism 1031 can comprise the rotating latch butterfly mechanism 200 (and corresponding docking station components) discussed above. However, it is contemplated that, for the three-point engagement docking system, conventional latches used in existing seat-back units can also be suitable.

Figure 11:
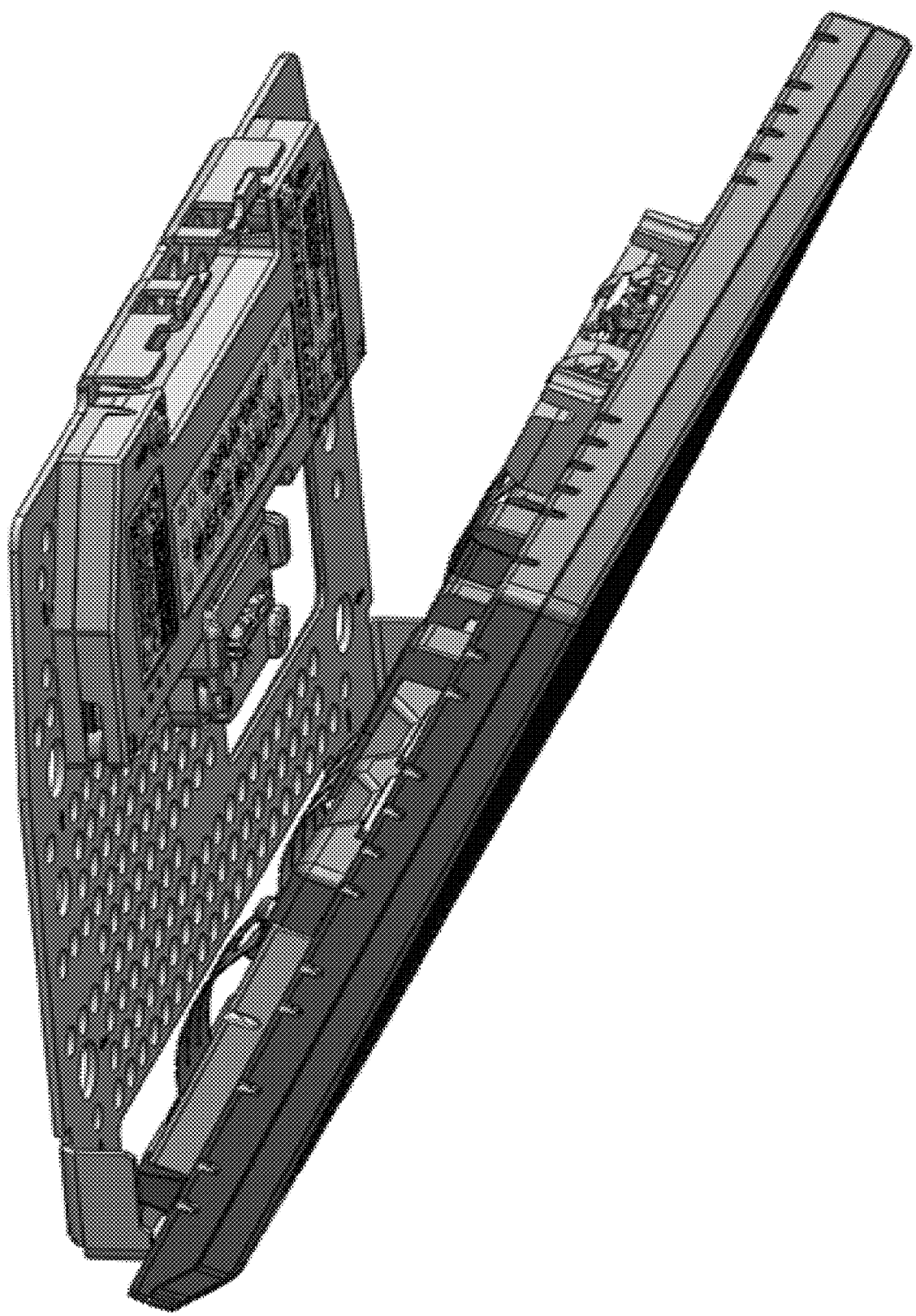
FIG. 11 illustrates the display unit mid-installation, according to embodiments of the inventive subject matter.
Figure 12:
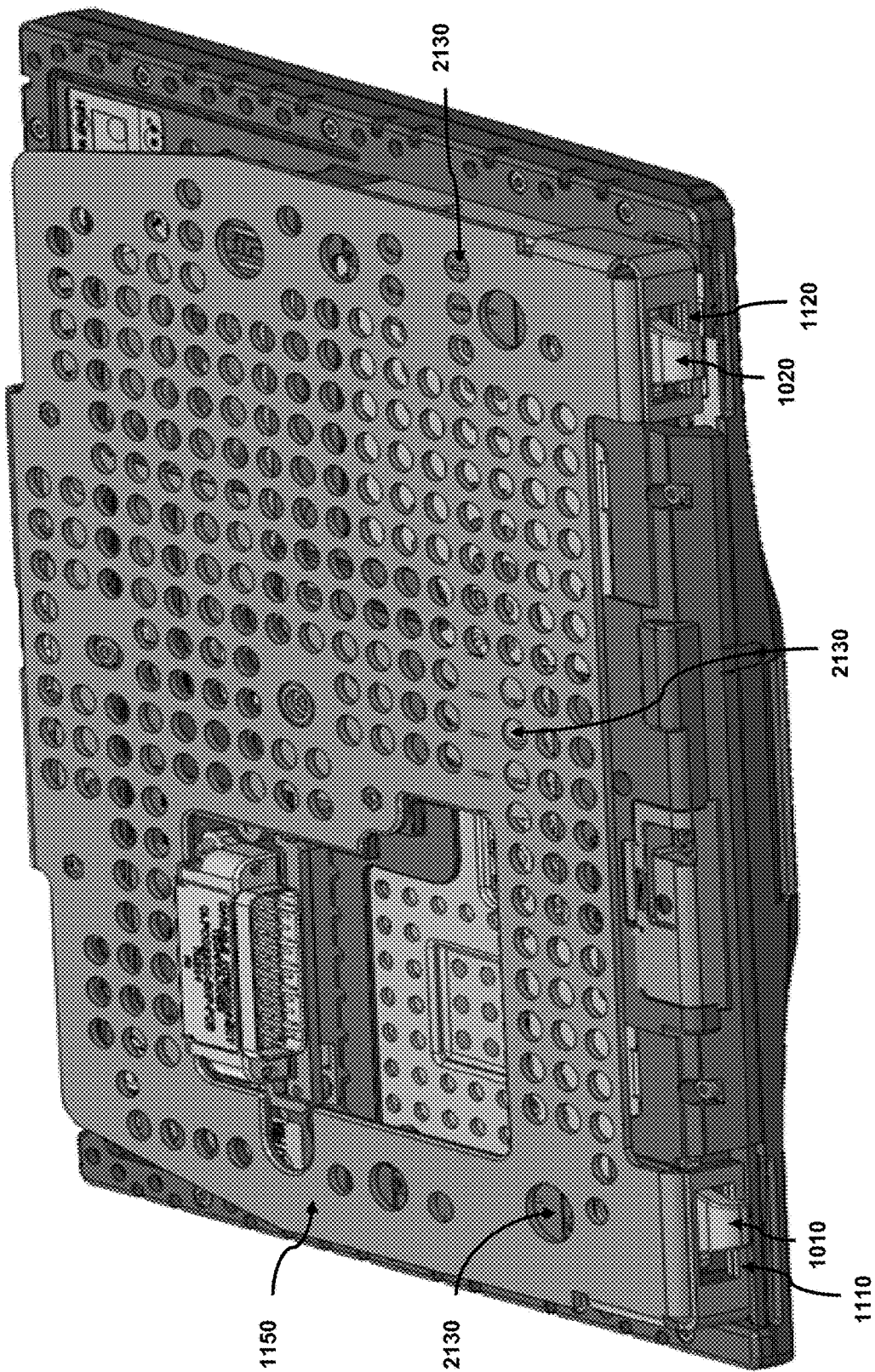
FIG. 12 illustrates the display unit of FIG. 10A installed with docking station from a isometric, rear perspective, according to embodiments of the inventive subject matter.

The display unit 1000 (also corresponding to display unit 101 of FIGS. 1A-1C) is installed into docking station 1100 (corresponding to docking station 102 of FIGS. 1A-1C) by inserting the hinge hooks 1010, 1020 into their corresponding hinge loops 1100, 1120 of docking station 1100, and then rotating the display unit 1000 upward until display attachment mechanism 1030 engages with the corresponding docking attachment mechanism 1130 of the docking station 1100. FIG. 11 illustrates the display unit 1000 mid-installation. FIG. 12 illustrates display unit 1000 of FIG. 10A installed with docking station 1100 from a isometric, rear perspective, showing hinge hooks 1010 and 1020 installed in hinge loops 1110, 1120, respectively. When installed, the ends of the hooks 1010, 1020 contact the underside surfaces of the hinge loops 1110, 1120, respectively, to "hook" the hinge loops and thus securing the display unit 1000 against movement in the positive Y-axis direction as well as removal of the unit from the loops in the Z-axis direction without first properly releasing the attachment mechanism 1031 and rotating the unit 1000 downward to be able to release the hooks 1010, 1020 from the loops 1110, 1120. The thickness of the hinge hooks 1010, 1020 and the dimensions of hinge hoops along the Z-axis are such that, when the display unit 1000 has been installed, the hinge hooks 1010, 1020 do not have freedom of movement within the hinge loops 1110, 1120 in the Z-axis direction. To facilitate installation, the thickness of the hooks can be tapered from a narrower thickness at the end such that the thickness of the end of the hook is easier to introduce into the corresponding hinge loop, and then the tapering of the thickness helps to guide the hook into a proper place within the loop as the display unit 1000 rotated into place.

Figure 13:
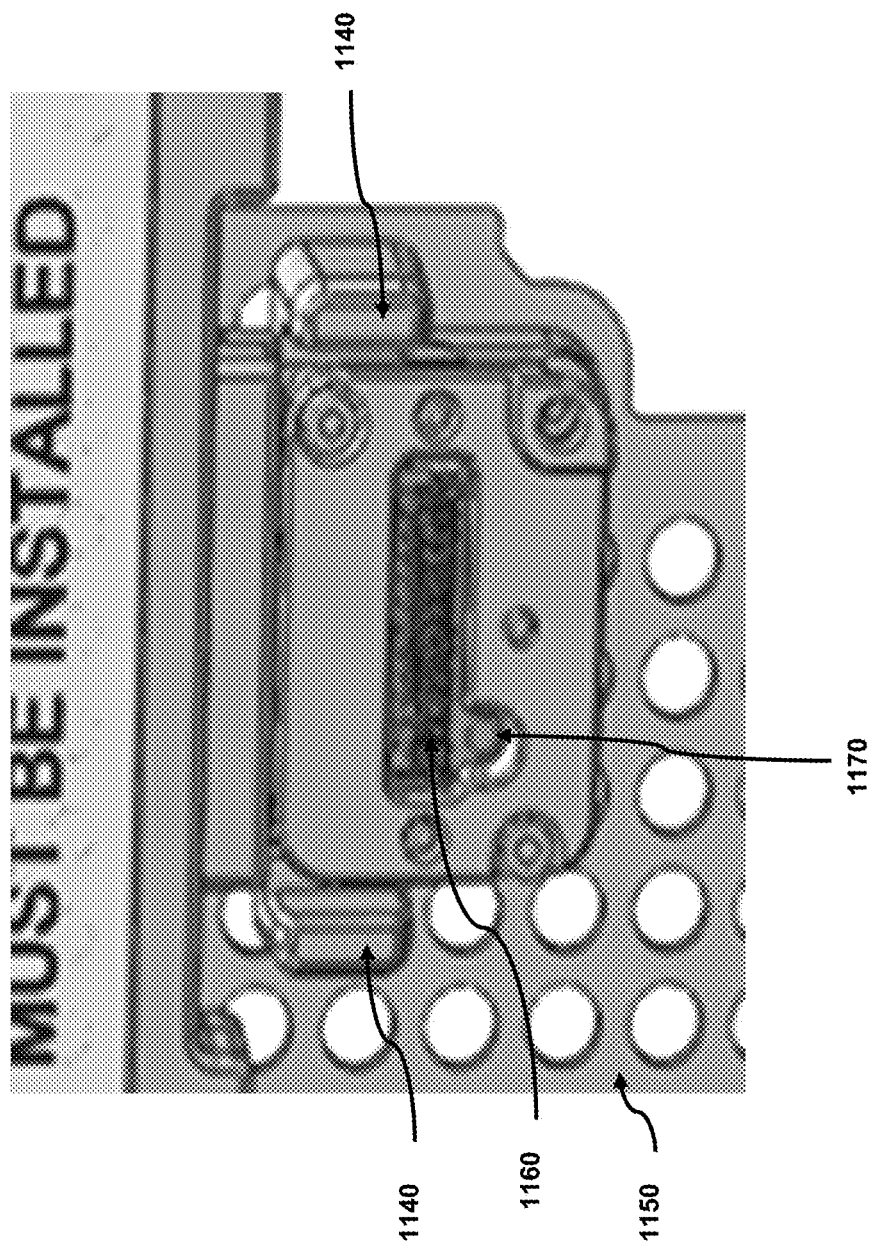
FIG. 13 provides a close-up view of various components of the docking station, according to embodiments of the inventive subject matter.
Figure 19:
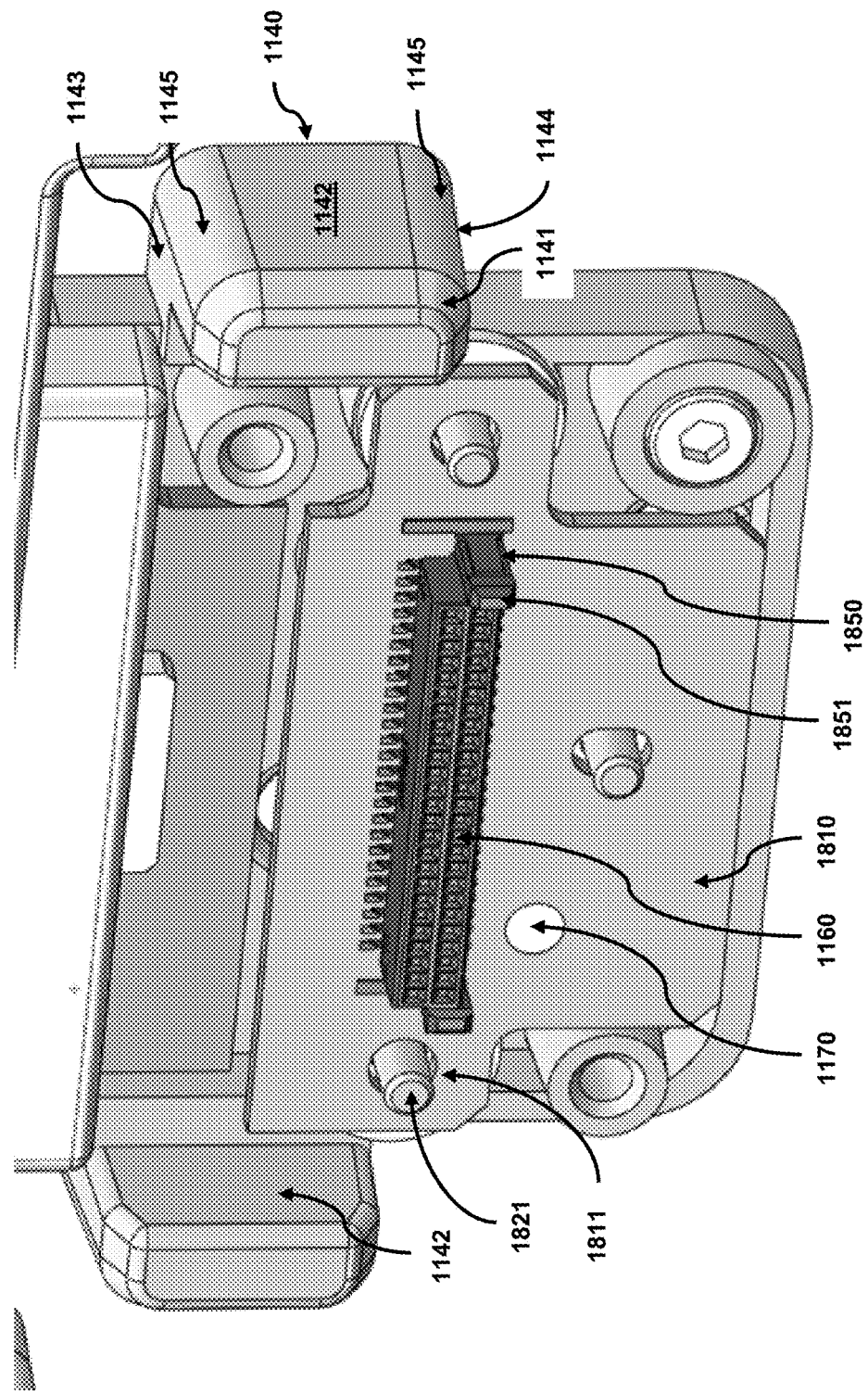
FIG. 19 provides a close-up view of various components of the docking station, according to embodiments of the inventive subject matter.

As seen in the embodiments of FIG. 10B, and in close-up views of FIGS. 13 and 19, the docking station 1100 includes, a pair of alignment tabs 1140 extending outwardly, away from rear panel 1150. The alignment tabs 1140 include tapered surfaces 1141 extending outward from the end of and disposed around the periphery of the alignment tab 1140, lateral surfaces 1142, top and bottom surfaces 1143, 1144, respectively, and curved corner surfaces 1145. During installation of the display unit 1000 into docking station 1100, these alignment tabs 1140 come into contact with corresponding display alignment surfaces 1040 of display unit 1000 to align connector 1060 of the display unit 1000 with the corresponding connector 1160 of docking station 1100.

Connectors 1060 and 1160 are corresponding connectable ends of a connector interface, can comprise any type of connector interface suitable for data, power, video, and/or audio connections. Typically, connector interfaces are arranged in a "male/female" physical pairing, but the connector interfaces can also include magnetic connectors or other connector interfaces having complementary connector ends. The examples illustrated herein show a pin connection interface, but examples of other suitable interfaces can include HDMI, USB, proprietary connectors, etc.

Figure 14:
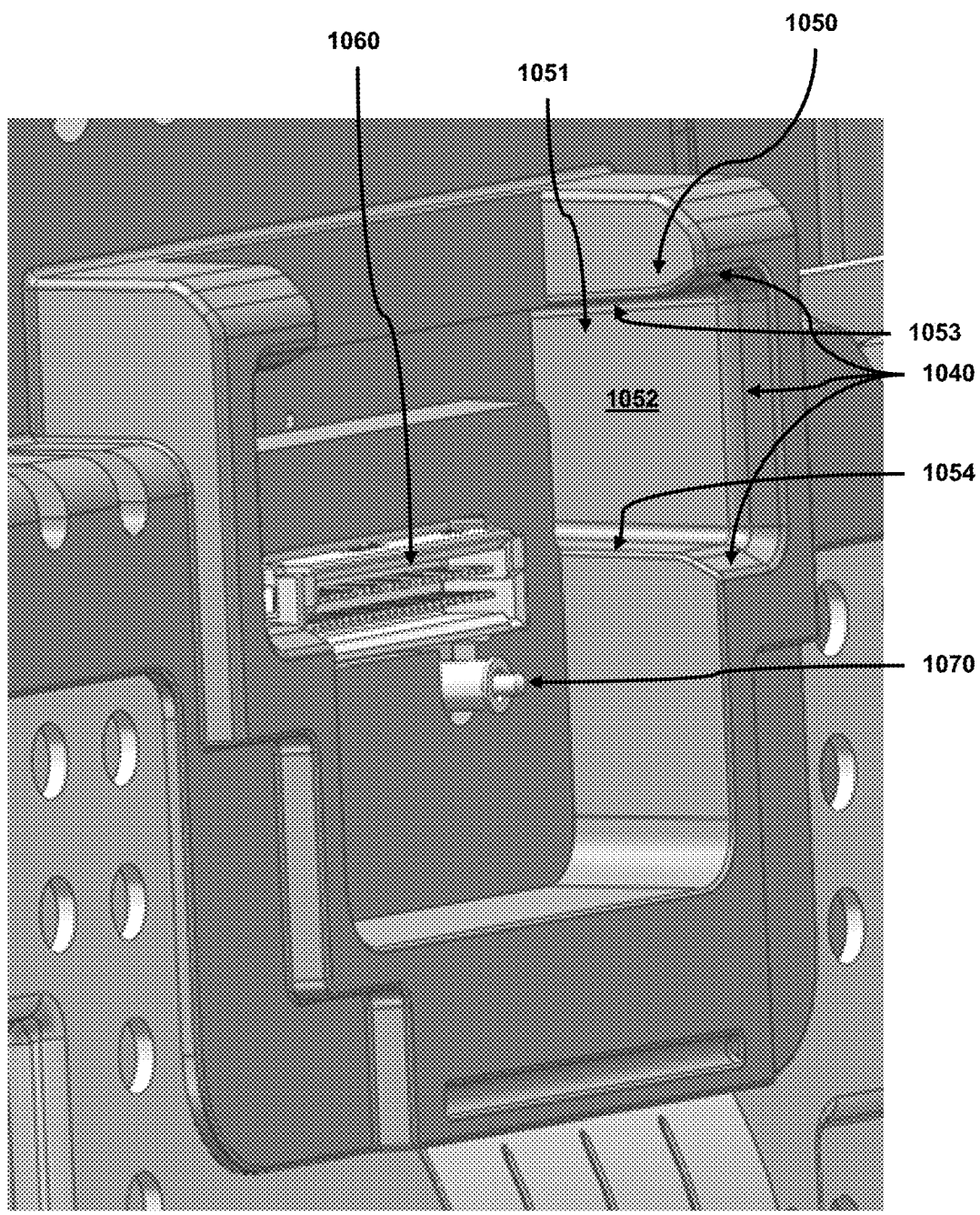
FIG. 14 provides a close-up view of the rear of the display unit, illustrating various components according to embodiments of the inventive subject matter.

The alignment surfaces 1040, not shown in the simplified view of FIG. 10, are illustrated in FIG. 14. In embodiments, such as that of FIG. 14, the display alignment surfaces 1040 can be considered to part of an alignment component 1050 of display unit 1000. The embodiment of FIG. 14 shows two mirroring alignment components 1050, with only one labeled for the purposes of clarity in illustration. In addition to the display alignment surfaces 1040, alignment component 1050 also includes cavities 1051 defined by side 1052, top 1053 and bottom 1054.

Thus, the contact of the tapered alignment surfaces 1040 with tapered surfaces 1141 of the alignment tabs 1140 will guide the alignment tabs 1140 into cavities 1051. The cavity 1051 is dimensioned to fit its corresponding alignment tab 1140 such that an inserted alignment tab 1140 is restrained from moving in one or more lateral directions. Thus, once the alignment tab 1140 are inserted into the cavity 1051, the contact between the surfaces 1142, 1143, 1144 of the alignment tabs 1140 and the corresponding surfaces 1052, 1053, and 1054 of cavity 1051 (and their respective curved corners) prevents lateral movement of the display unit 1000 relative to docking station 1100.

In the embodiments shown herein, two alignment tabs 1140 are used and as such, the mirroring cavities 1051 only have to have three sides. Depending on the number of alignment tabs and corresponding cavities used, the number of sides required for each cavity can change as the restriction of movement in the different lateral directions can be shared. For example, in embodiments where only a single cavity and single alignment tab are used, restricting all lateral movements via an engagement of the corresponding side surfaces would require the single cavity to contact the alignment tab on all sides.

In a variation of these embodiments, it may be desirable to restrict lateral movements in certain directions and not necessary to do so in others. In these embodiments, the cavities 1051 can be dimensioned such that the alignment tab 1140 fits to restrict movement only in those desired directions. Thus, if the movement is to be restricted in the lateral "sideways" (along the X-axis) directions but not "up" or "down" (along the Y-axis), then the alignment tabs 1140 and corresponding cavities 1051 would be dimensioned such that the sides 1142 of fully inserted tabs 1140 would be in contact with the corresponding sides 1052 of the cavity 1051, but there would be space between the respective top and bottom surfaces of the tabs 1140 and cavities 1051. This tolerance can make the installation and removal of the display unit 1000 easier, especially where the installation of the display unit 1000 require a rotation about hinge hooks into place.

Because the fit between tabs 1140 and cavities 1051 prevent the lateral movement of the display unit 1000 relative to docking station 1100, the hinge hooks 1010, 1020 and the respective hinge loops 1110, 1120 can be dimensioned to have some tolerance or degree of lateral movement along the X-axis. As such, the alignment between the hinge hooks 1010, 1020 and the respective hinge loops 1110, 1120 does not have to be absolutely precise to ensure that proper connection between connectors 1060, 1160 is achieved and maintained. Thus, in these embodiments, the lateral dimensions of the hinge loops 1110, 1120 are larger than the lateral dimensions of the respective hinge hooks 1010, 1020. For example, the lateral dimensions of the hinge loops can be at least 5%, 10%, 25%, or even 50% larger than the lateral dimensions of the corresponding hinge hooks.

It is contemplated that, in other embodiments, the display alignment surfaces 1040 can simply be tapered surfaces or tabs extending from the back of the display unit 1000 without the other aspects of alignment component 1050, that are disposed such that the contact between the surfaces 1040 and the tapered surfaces of alignment tabs 1140 brings the display unit 1000 and docking station 1100 into alignment.

C) Current Control System

In embodiments of the inventive subject matter, the supply of current from the docking station 1100 to a removable display unit 1000 can be controlled via a current control system that includes a current control pin such that current is not supplied via from the docking station to the display unit 1000 until the current control pin is engaged. To prevent potential shock injury to personnel or a passenger, or potential damage to the system due to premature current supply, the current control system of the inventive subject matter ensures that current is not supplied by the docking station 1100 powered unless a connector 1060 of the display unit 1000 is properly engaged with the connector of the 1160.

FIG. 14 provides an illustrative view of the rear section of display unit 1000 that includes current control pin 1070 and connector interface 1060, according to embodiments of the inventive subject matter. The current control pin 1070 allows for an order of operations in connecting the seat-back display unit 1000 to docking station 1100.

Figure 15:
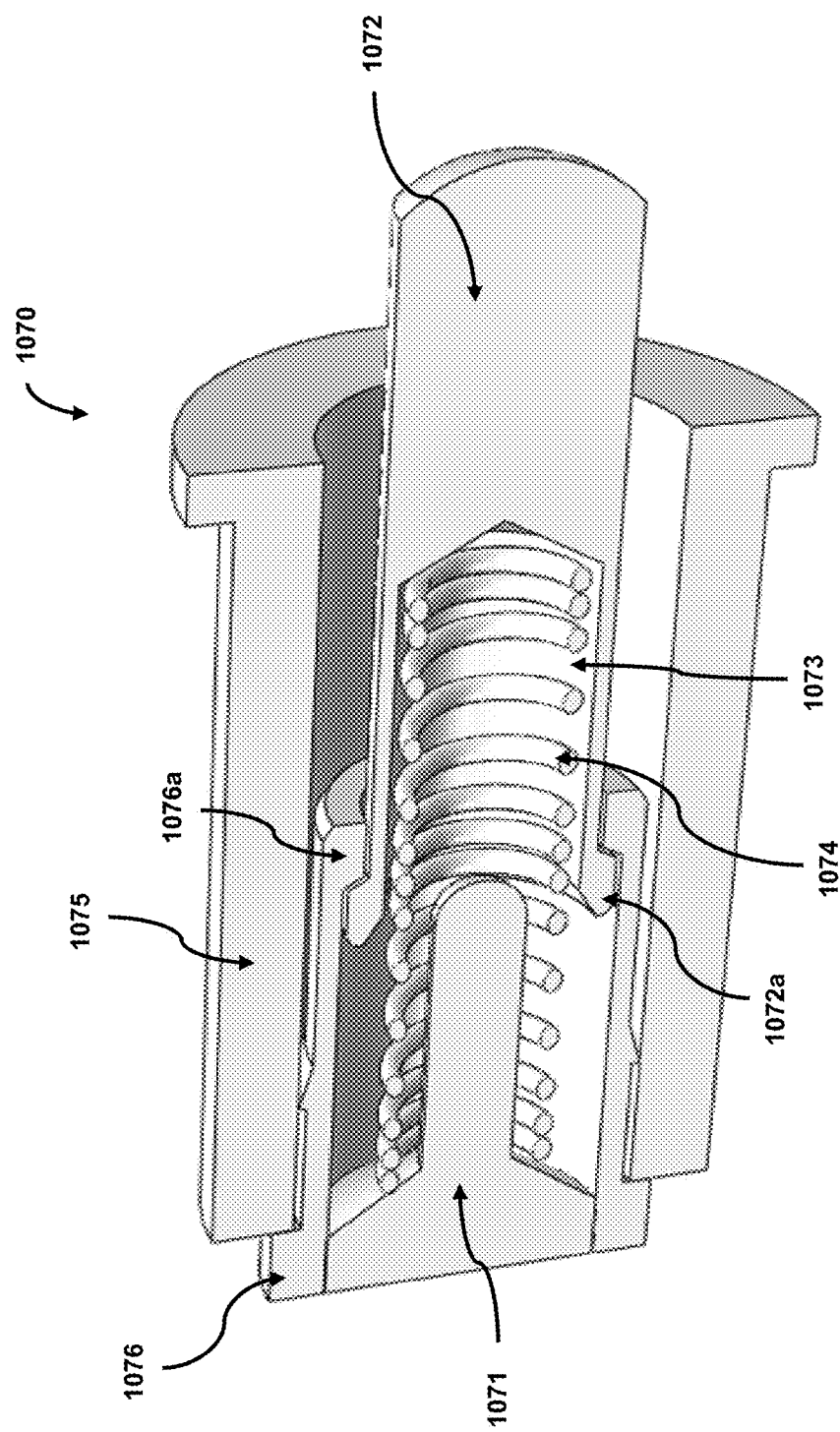
FIG. 15 provides a detailed cross-section view of current control pin, according to embodiments of the inventive subject matter.

FIG. 15 provides a detailed cross-section view of current control pin 1070. As seen in FIG. 15, spring 1074 (preferably a compression spring) is partially disposed within inner cavity 1073 of contact pin 1072 at a first end and around an inner contact pin 1071 at the second end. The current control pin 1070 also includes an outer housing 1075 and an inner housing 1076. The inner housing 1076 can include tab 1076a, which comes into contact with tab 1072a of the contact pin, thus limiting the outward travel of contact pin 1072 within outer housing 1075.

The inner contact pin 1071 is attached to the rear of the display unit 1000, such as to the back plate, such that the contact pin is electrically and/or communicatively coupled with the appropriate internal components of the display unit 1000. In the example of FIG. 15, the inner house 1076 is also attached to the rear of the display unit 1000. The outer housing 1075 is then coupled with the inner housing 1076.

FIG. 15 illustrates the state of pogo pin 1070 when no external force is applied to the contact pin 1072. As such, at FIG. 15, the contact pin 1072 is at full outward extension. At the state shown in FIG. 15, spring 1074 is at a fully unloaded state or, in embodiments, at a slightly compressed state, such that it provides force upon contact pin 1072 to keep the contact pin 1072 at the fully extended state (with tabs 1072a abutting tabs 1076a).

The current control system also includes a corresponding contact point 1170 on docking station 1100, as shown in FIG. 13. The contact pin 1072 and docking connector 1060 on display unit 1000 and contact point 1170 and docking connector 1160 on docking station 1100 are arranged such that docking connectors 1060, 1160 and the contact pin 1072 and contact point 1170 are in respective alignment when the display unit 1000 is installed in the docking station 1100.

Figure 16:
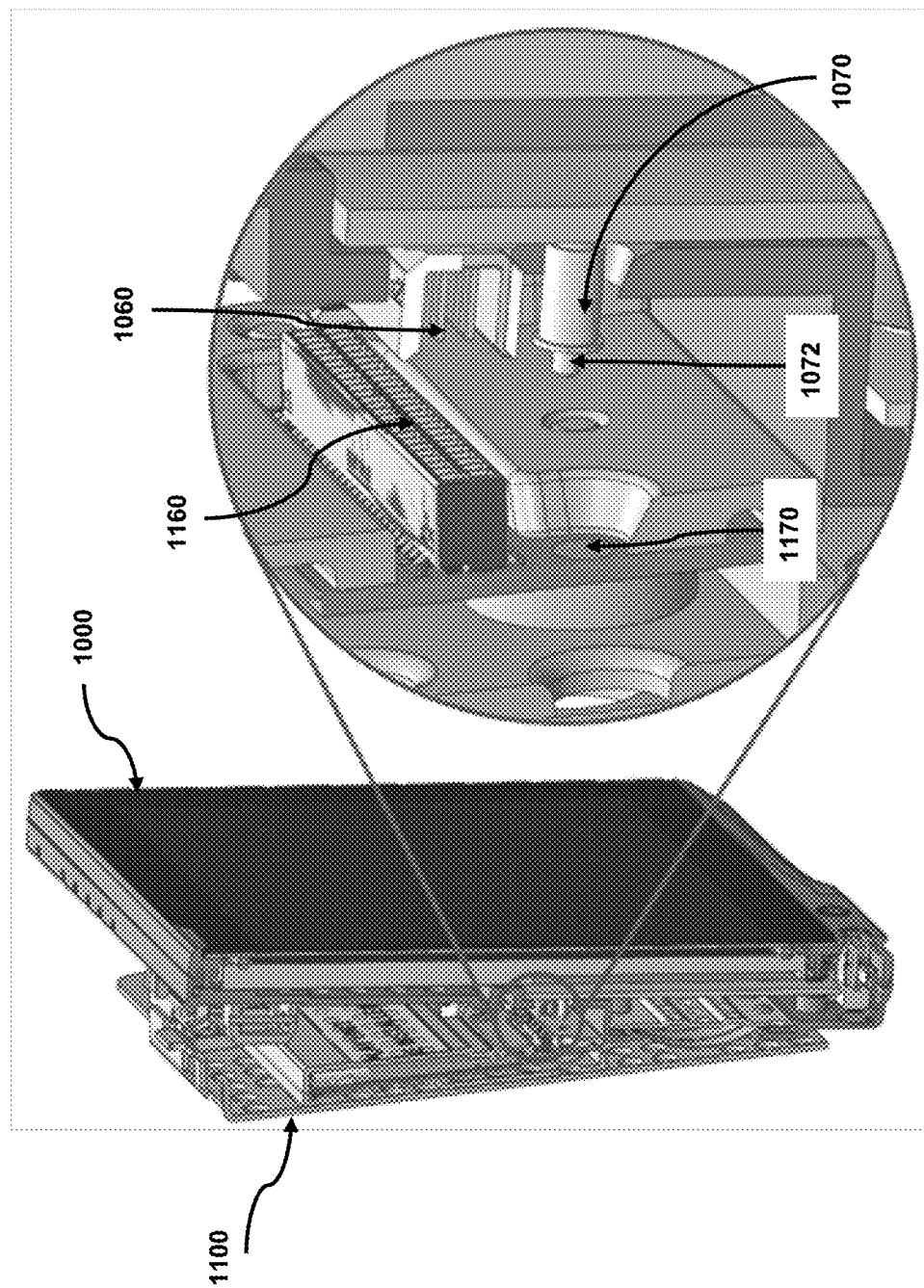
FIG. 16 illustrates display unit during installation with the docking station according to embodiments of the inventive subject matter.

FIG. 16 illustrates display unit 1000 during installation with the docking station 1100, with a close-up view of the relative positions of connectors 1060, 1160 and of current control pin 1070 (with contact pin 1072 visible) and contact point 1170.

As the display unit 1000 is installed in the docking station 1100, the contact pin 1072 comes into contact with the contact point 1170. As the seat-back unit 1000 is brought closer to the final installation position, the movement of the seat-back unit 1000 (with contact pin 1072 contacting contact point 1170) towards the docking station 1100 causes the compression of spring 1074, bringing inner contact pin 1071 toward contact pin 1072 until the inner contact pin 1071 comes into contact with the contact pin 1072, thus "engaging" the current control pin 1070.

In embodiments, the contact point 1170 is coupled to a current source, and made of an electrically conductive material. In these embodiments, the inner contact pin 1071 and contact pin 1072 are made of electrically conductive materials and the inner contact pin 1071 is coupled to the power drawing components of the display unit 1000. In these embodiments, the current is supplied via the contact point 1170 through the engaged contact pin 1072 and inner contact pin 1071. Thus, until the inner contact pin 1071 and contact pin 1072 are engaged, no current passes from the contact point 1170 to the display unit 1000.

In other embodiments, the contact pin 1070 serves to complete a signal pathway or close a signal circuit, whereby the contact point 1170 serves to emit a signal that is only ably returned to a controller within docking station 1100 if the contact pin 1072 and inner contact pin 1071 are engaged. In these embodiments, only once the controller of the docking station 1100 receives a return signal from the display unit 1000 does the docking station begin supplying current (via connector 1160 if it is capable of also supplying power, or via a separate power connector interface that is also brought into contact).

Figure 17:
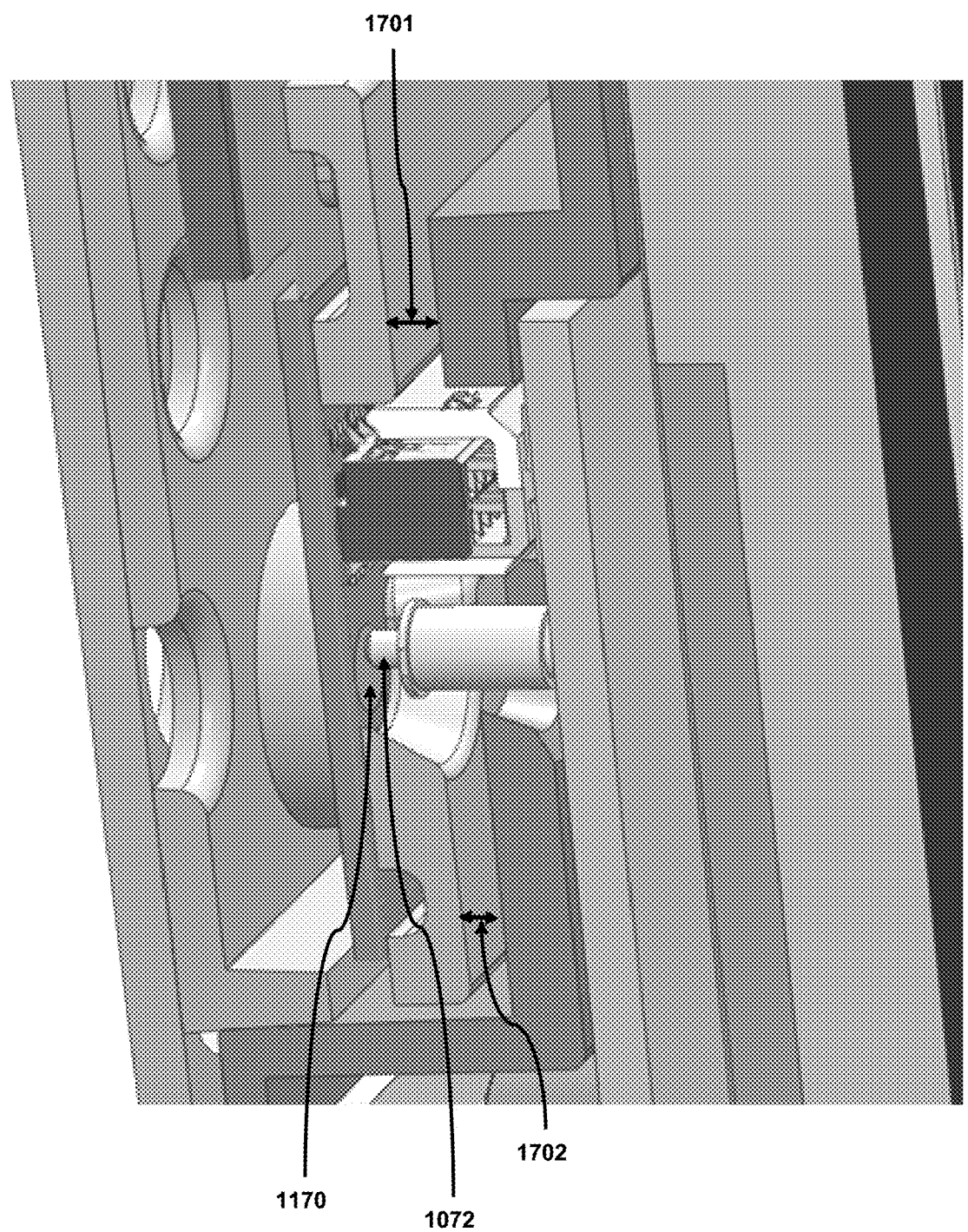
FIG. 17 shows the instance where the docking connectors have become engaged, and the contact pin has contacted the contact point, but the contact pin has not yet been pushed back toward inner contact pin, according to embodiments of the inventive subject matter.

The inner contact pin 1071, contact pin 1072, and inner housing 1076 are dimensioned such that, during installation, the docking connectors 1060, 1160 become engaged before the contact pin 1072 travels sufficiently to contact inner contact pin 1071. Thus, docking connectors 1060, 1160 are preferably of a connector interface that is capable of operating without requiring a complete insertion of the pins of interface 1060 into the corresponding sockets of interface 1160, such that a degree of additional travel in the direction of the docking station 1100 allows for the completion of the engagement of the current control pin 1070. FIG. 17 shows the instance where the docking connectors 1060, 1160 have become engaged, and the contact pin 1072 has contacted contact point 1170, but the contact pin has not yet been pushed back toward inner contact pin 1071 (i.e., the amount of visible section of contact pin 1072 is approximately the same as in FIG. 16). As shown at least by gaps 1701 and 1702, as well as the visible amount of pins of connector 1060, there is a further amount of travel (which can be less than or equal to the dimensions of gaps 1701, 1702 between the display unit 1000 and docking station 1100 and/or travel left of pins of connector 1060 into the corresponding sockets) that the display unit 1000 can take before being at a fully installed position. If it is assumed that the snapshot of FIG. 17 is the point at which the connectors 1060, 1160 can be considered to be engaged, the amount of travel of contact pin 1072 to come into contact with inner contact pin 1071 will be less than or equal to this remaining travel.

When the display unit 1000 is unlocked and pulled away from the docking station 1100, the order of operations will be the reverse of that of installation. That is, as the display unit 1000 is pulled away from the docking station 1100, the spring 1074 will cause the current control pin 1070 to become disengaged before the docking connectors 1060, 1160 become disengaged. Thus, the supply of current to the display unit 1000 will be interrupted before the docking connectors 1060, 1160 are separated.

D) Floating Connector Dock System

The floating pin connector dock allows for the docking of a display unit 1000 whose pin (or other interface) connector 1060 is not exactly aligned with the pin (or other interface) connector 1160 of the docking station 1100.

Figure 18:
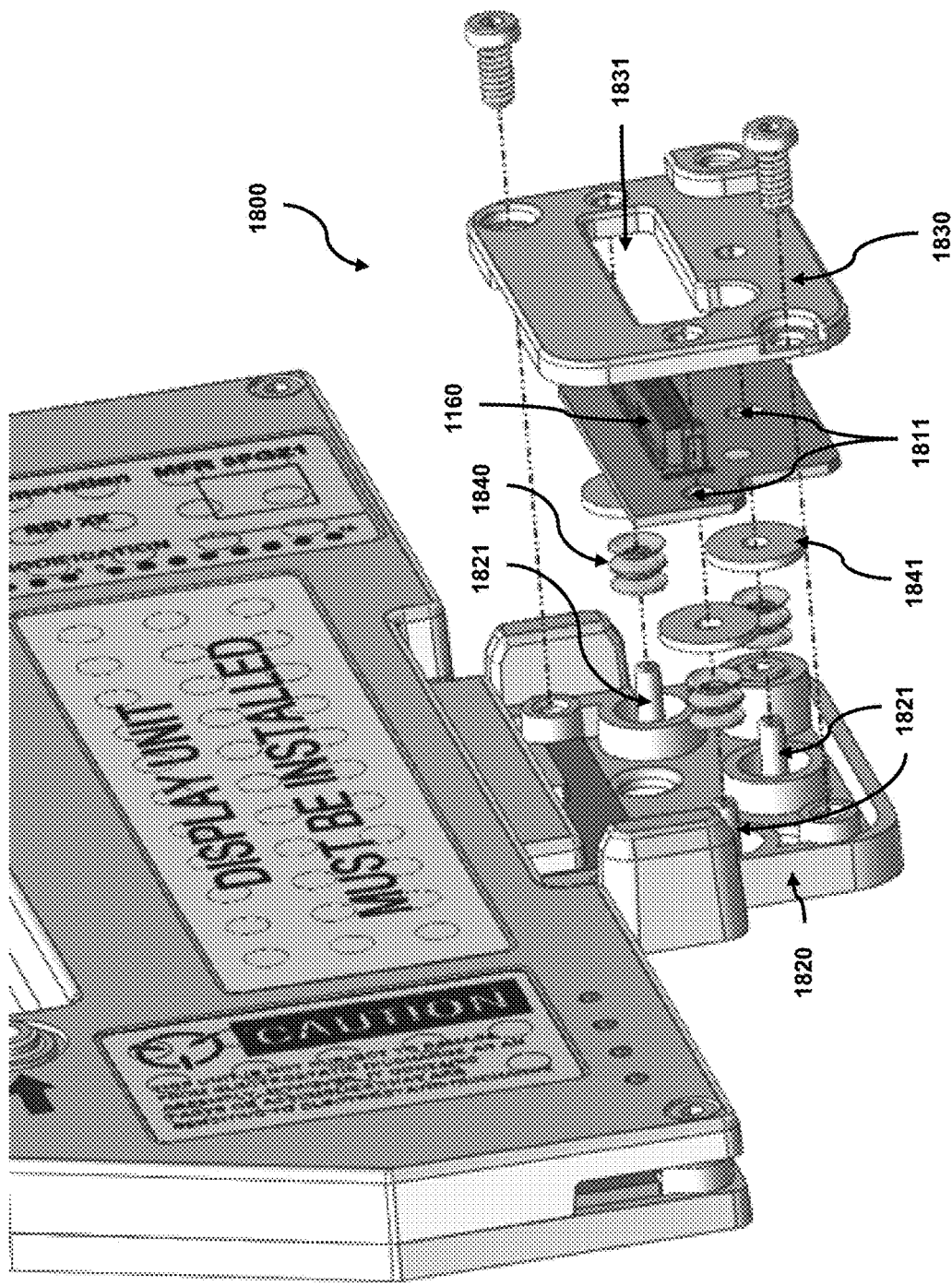
FIG. 18 provides an exploded view of the floating pin connector dock system of a docking station, according to embodiments of the inventive subject matter.

FIG. 18 provides an exploded view of the floating pin connector dock system 1800 of a docking station, according to embodiments of the inventive subject matter.

As shown in FIG. 18, the floating pin connector dock system 1800 includes a connector interface plate 1810, to which the connector 1160 is attached. The connector interface plate 1810 is installed between the real panel 1820 and front panel 1830. In order to account for a misalignment of the pin connector 1160, the floating pin connector dock system 1800 enables the connector interface plate 1810 to move relative to the panels 1820, 1830. To allow a degree of freedom of movement, the connector interface plate 1810 is held in place via guide pins 1821 (three pins shown in the illustrative embodiment, but the contemplated number of pins can be fewer than three or greater than three) fitting through pin openings 1811 of the plate 1810. The areas of pin openings 1811 and the cross-section areas of their corresponding pins 1821 have a tolerance that allows the connector interface plate 1810 to move relative to the pins 1821. The tolerance can depend on the size of the connector 1160, the size of the required connector interface plate 1810 for a particular connector 1160, and other factors. Examples of contemplated tolerances can include 0.5 mm, 1 mm, 2 mm, 5 mm, 7.5 mm, and 10 mm.

Front panel 1830 is rigidly attached to rear panel 1820, such that no relative movement between the front panel 1830 and rear panel 1820 exists. Front panel 1830 includes an opening 1831 through which the connector 1160 can be accessed for connection with the corresponding connector 1060 of the removable display unit 1000.

In embodiments of the inventive subject matter that include the contact pin described in section C above (and also illustrated in FIG. 18), the opening 1831 also provides access to contact point 1170 for the corresponding contact pin 1070 of the display unit 1000.

As with the pins 1821 and pin openings 1811, the area of opening 1831 is large enough to provide a tolerance of movement of the connector 1160 and contact point 1170 relative to the front panel 1830, such that the connector 1160 and contact point 1170 remain accessible via opening 1831 even if displaced by the tolerance amount. The tolerance provided by the opening 1831 is preferably greater or equal to the tolerance between the pins 1821 and pin openings 1811.

In order to keep the connector interface plate 1810 from rattling around within the assembled panels 1820, 1830, the system 1800 includes a disk springs 1840 installed on guide pins 1821, placed between the rear panel 1820 and the connector interface plate 1810. FIG. 18 also shows washers 1841 used between the disk springs 1840 and the underside of connector interface plate 1810.

To align the floating connector 1160 with the corresponding connector 1060 of the display unit 1000, the system 1800 also includes alignment tabs 1850 attached to the connector interface plate 1810, disposed on each side of the connector 1160. The alignment tabs 1850 extend outward from connector interface plate 1810 beyond the connector 1060 and include sloped or tapered surfaces 1851. FIG. 19 provides a view of the installed connector interface plate 1810 with the front plate 1830 removed, and provides a clear view of the alignment tabs 1850.

Figure 20:
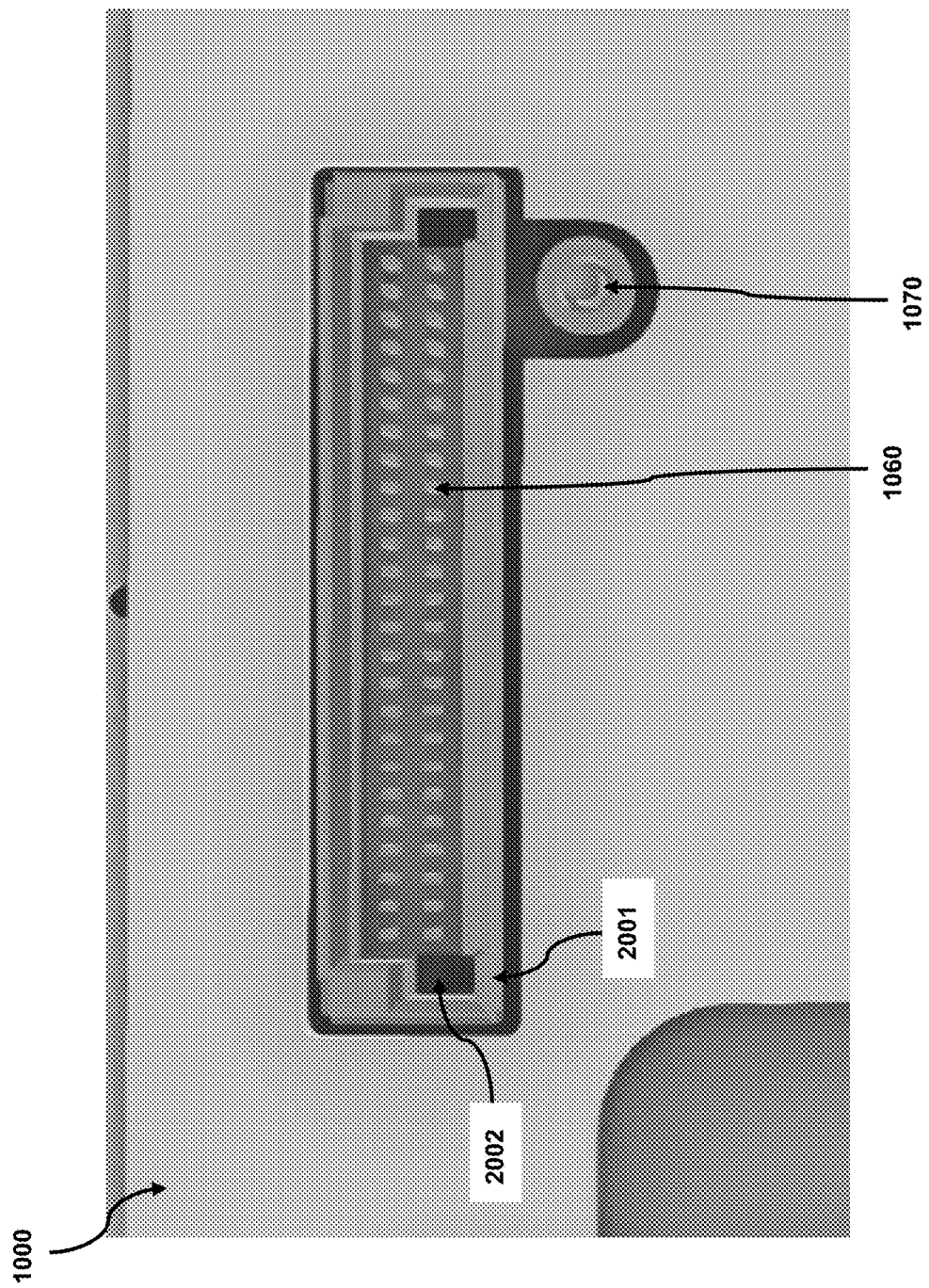
FIG. 20 provides a close-up view of the rear of the display unit, including connector alignment surfaces and cavities, according to embodiments of the inventive subject matter.

In these embodiments, the display unit 1000 can also include tapered alignment surfaces 2001 and cavities 2002, as shown in FIG. 20. Cavities 2002 are dimensioned to receive the alignment tabs 1850. Thus, if the connector 1060 of the display unit 1000 and the connector 1160 of the docking station 1100 are misaligned, the contact of the tapered surfaces 1851 of alignment tabs 1850 with the tapered alignment surfaces 2001 will cause the connector interface plate 1810 to move such that the connector 1160 is brought into alignment with connector 1060. Once fully aligned, the insertion of alignment tabs 1850 into cavities 2002 will ensure that the connectors 1160,1060 remain in alignment during and after engagement.

The connector interface plate 1810 can be a PCB that provides a data connection between the connector 1160 with a corresponding static PCB housed within the docking station that provides a data connection to external sources/recipients of data (e.g. networking components of the docking station that communicate with other computing devices, storage integrated into the seatback and/or docking station, etc.). To account for the relative movement of the connector interface plate 1810 and the static PCB component of the docking station, the connector interface plate 1810 and static PCB component can be connected via a wired connection and/or a flexible PCB board section. In embodiments, the connector interface plate 1810 and static PCB component can have corresponding aligned contacts with sufficient dimensions to account for the possible movement distances of the interface plate 1810 such that they remain in contact regardless of the movement or position of interface plate 1810 relative to the static PCB board section.

E) Heat Dissipation System

In embodiments of the inventive subject matter, heat dissipation system 2100 allows the heat load from the seat-back unit to be shared with the docking station.

FIG. 10A illustrates the components of heat dissipation system 2100 corresponding to the display unit 1000. As seen in FIG. 10A, the PCB main board 2110 of display unit 1000 is in contact with heat sink 2120. Thus, in this example, the PCB main board 2110 can be considered a "heat source." Heat sink 2120 is made of a thermally-conductive material. Leaf springs 2130, made of a thermally-conductive material, are thermally coupled to the heat sink 2120. FIG. 10A shows three leaf springs 2130, but it is contemplated that the amount of leaf springs 2130 can vary to account for factors such as the size of display unit 1000, the amount of heat needing to be dissipated, the size of leaf spring(s) 2130, arrangement of the rear of display unit 1000 and/or the docking station 1100 (and thus, the available spaces for placement of the leaf spring(s) 2130), etc.

In these embodiments, the docking station 1100 includes at least one thermally conductive element aligned to come into contact with leaf springs 2130 such that heat is transferred via conduction through the leaf springs to the thermally-conductive element of docking station 1100, increasing the amount of surface area bearing the thermal load. For the embodiments illustrated herein, the rear plate 1150 shown in FIG. 10B is made of a thermally-conductive material and is used as the thermally-conductive element. In other embodiments, separate thermally-conductive materials can be attached to the docking station 1100.

FIG. 12 illustrates the heat dissipation system 2100 of a display unit 1000 docked with docking station 1100. As seen in FIG. 12, the leaf springs 2130 (visible through the perforations in plate 1150) are in contact with the rear plate 1150 of docking station 1100.

In certain embodiments, the heat dissipation system can also use the hinge hooks 1010, 1020 to transfer heat to the docking station 1100. In these embodiments, illustrated in FIG. 10A, the hinge hooks 1010, 1020 can be made of a thermally-conductive material and be thermally coupled with heat sink 2120. In the example of FIG. 10A, the hinge hooks 1010, 1020 are thermally coupled with heat sink 2120 via thermally-conductive elements 2121 and 2122, respectively. In these embodiments, the hinge loops 1110, 1120 are also made of thermally-conductive materials and thermally coupled with the thermally conductive elements of docking station 1100. In the example illustrated in FIG. 10B, the hinge loops 1110, 1120 are of a unitary construction with back plate 1150, and as such are made of the same thermally-conductive material.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A floating connector dock system for a removable entertainment system, comprising:
    a docking station, comprising:
    a rear panel;
    a connector interface plate, the connector interface plate including a first perforation;
    a first connector interface attached to the connector interface plate;
    a first guide pin extending outward from the rear panel and passing through the first perforation of the connector interface plate, wherein the first perforation is dimensioned relative to the width of the first guide pin to allow for lateral movement of the connector interface plate relative to the first guide pin within a tolerance;
    a spring mechanism disposed around the at least one guide pin and disposed to contact the rear panel and the connector interface plate;
    at least one dock alignment tab attached to and extending outward from the connector interface plate;
    a front panel rigidly attached to the rear panel by at least one fastener, such that the front panel is fixed in place relative to the rear panel, wherein the connector interface plate is disposed between the rear panel and the front panel;
    wherein the front panel comprises a first opening distinct from the first perforation, and wherein at least a portion of the first connector interface passes through the first opening;
    wherein the first guide pin passes through a second perforation of the front panel; and
    a current control pin configured to provide current to the removable display unit when the removable display unit is docked with the docking station;
    wherein the current control pin comprises (i) an outer contact pin, (ii) an inner contact pin disposed within a portion of the outer contact pin and affixed to the rear of the removable display unit, and (iii) a spring disposed around the inner contact pin, such that exertion of a three on the outer contact pin causes the spring to compress and the outer contact pin to travel toward the inner contact pin until the outer contact pin contacts the inner contact pin;

wherein at least a portion of the current control pin passes through the first opening.

2. The floating connector dock system of claim 1, further comprising:

a removable display unit configured to dock with the docking station, the removable display unit comprising:
at least one display alignment mechanism corresponding to the at least one dock alignment tab; and
a second connector interface configured to interface with the first connector interface;

wherein the at least one dock alignment tab is configured to interact with the corresponding at least one display alignment mechanism to align the first connector interface of the docking station with the second connector interface of the removable display unit.

3. The floating connector dock system of claim 2, wherein the at least one display alignment mechanism comprises at least one display alignment surface configured to interact with the corresponding at least one dock alignment tab, the at least one display alignment surface tapered toward a direction of alignment.

4. The floating connector dock system of claim 2, wherein the spring mechanism comprises a disk spring.

5. The floating connector dock system of claim 2, the docking station further comprising:

wherein the connector interface plate is supported by the first guide pin.

6. The floating connector dock system of claim 2, wherein the first perforation is dimensioned to have an area larger than that of the corresponding first connector interface and the at least one dock alignment tab by at least the tolerance in at least one lateral direction.

7. The floating connector dock system of claim 2, wherein the removable display unit further comprises:

a heat source;
a heat sink thermally coupled to the heat source; and
at least one leaf spring thermally coupled to the heat sink, the at least one leaf spring extending outwardly from the heat sink and made of a thermally conductive material; and wherein the docking station is configured to receive the removable display unit, wherein the docking station comprises at least one thermally conductive element aligned to contact the at least one leaf spring of the removable display unit when the removable display unit is docked with the docking station.

8. The floating connector dock system of claim 7, wherein:

the removable display unit further comprises at least one first attachment mechanism thermally coupled to the heat sink; and the docking station further comprises at least one second attachment mechanism thermally coupled to the at least one thermally conductive element, the at least one second attachment mechanism is configured to interact with the corresponding at least one first attachment mechanism to secure the removable display unit with the docking station when the removable display unit is docked with the docking station;

wherein the at least first one attachment mechanism and the at least one second attachment mechanism are made of thermally-conductive materials.

9. The floating connector dock system of claim 8, wherein:

the at least one first attachment mechanism comprises at least one hinge hook extending from an underside of the removable display unit, the first hinge hook curved toward a front side of the removable display unit; and the at least one second attachment mechanism comprises a hinge loop configured to receive the first hinge hook.

* * * * *